(12) United States Patent
Schwartz et al.

(10) Patent No.: US 12,002,219 B2
(45) Date of Patent: *Jun. 4, 2024

(54) IDENTIFYING ONE OR MORE EVENTS IN CONTENT

(71) Applicant: Comcast Cable Communications, LLC, Philadelphia, PA (US)

(72) Inventors: Erik Schwartz, Kensington, MD (US);
Jan Neumann, Arlington, VA (US);
Hans Sayyadi, Washington, DC (US);
Stefan Deichmann, Alexandria, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,682

(22) Filed: Aug. 26, 2022

(65) Prior Publication Data
US 2023/0040708 A1     Feb. 9, 2023

Related U.S. Application Data

(63) Continuation of application No. 16/845,876, filed on Apr. 10, 2020, now Pat. No. 11,461,904, which is a
(Continued)

(51) Int. Cl.
*G06T 7/20* (2017.01)
*G06F 16/48* (2019.01)
(Continued)

(52) U.S. Cl.
CPC ............ *G06T 7/20* (2013.01); *G06F 16/48* (2019.01); *G06F 16/745* (2019.01); *G06F 16/7867* (2019.01); *G06V 20/42* (2022.01); *G06V 20/49* (2022.01); *H04N 5/783* (2013.01); *H04N 21/44008* (2013.01); *H04N 21/84* (2013.01);
(Continued)

(58) Field of Classification Search
None
See application file for complete search history.

(56) References Cited

U.S. PATENT DOCUMENTS 8,087,054 B2 * 12/2011 Zacks .................. G11B 27/034
725/135
8,200,063 B2    6/2012 Chen et al.
(Continued)

FOREIGN PATENT DOCUMENTS

EP     2204747 A1    7/2010
EP     2362396 A2    8/2011

OTHER PUBLICATIONS

May 10, 2016 (EP) Extended Search Report—App. 15189947.3.
(Continued)

*Primary Examiner* — Tahmina N Ansari
(74) *Attorney, Agent, or Firm* — Banner & Witcoff, Ltd.

(57) ABSTRACT

According to some aspects, methods and systems may include receiving, by a computing device, metadata identifying an event occurring in a video program, and determining an expected motion of objects in the identified event. The methods and systems may further include analyzing motion energy in the video program to identify video frames in which the event occurs, and storing information identifying the video frames in which the event occurs.

20 Claims, 7 Drawing Sheets

Related U.S. Application Data continuation of application No. 15/480,694, filed on Apr. 6, 2017, now Pat. No. 10,657,653, which is a continuation of application No. 14/514,602, filed on Oct. 15, 2014, now Pat. No. 9,646,387.

(51) Int. Cl.
| | | |
|---|---|---|
| *G06F 16/74* | (2019.01) | |
| *G06F 16/78* | (2019.01) | |
| *G06V 20/40* | (2022.01) | |
| *H04N 5/783* | (2006.01) | |
| *H04N 21/44* | (2011.01) | |
| *H04N 21/84* | (2011.01) | |
| *H04N 21/845* | (2011.01) | |

(52) U.S. Cl.
CPC ............ *H04N 21/8456* (2013.01); *G06T 2207/10016* (2013.01); *G06T 2207/30221* (2013.01); *G06V 20/44* (2022.01)

(56) References Cited

U.S. PATENT DOCUMENTS

| | | |
|---|---|---|
| 8,345,102 B2 | 1/2013 | Huang et al. |
| 2003/0028896 A1* | 2/2003 | Swart ............... H04N 21/44204 348/E7.071 |
| 2008/0052739 A1* | 2/2008 | Logan ................... H04H 60/80 348/E7.071 |
| 2008/0192116 A1 | 8/2008 | Tamir et al. |
| 2008/0193016 A1 | 8/2008 | Lim et al. |
| 2008/0232687 A1 | 9/2008 | Petersohn |
| 2009/0080853 A1* | 3/2009 | Chen ...................... G06F 16/786 386/242 |
| 2010/0124378 A1 | 5/2010 | Das et al. |
| 2010/0158470 A1 | 6/2010 | Tzoukermann et al. |
| 2011/0013087 A1 | 1/2011 | House et al. |
| 2011/0107235 A1 | 5/2011 | Woo |
| 2013/0031266 A1* | 1/2013 | Gilson .................... H04N 5/783 709/232 |
| 2013/0265434 A1 | 10/2013 | Iwamoto et al. |
| 2014/0168517 A1 | 6/2014 | Petajan et al. |
| 2014/0333775 A1* | 11/2014 | Naikal ............. H04N 21/44008 348/159 |
| 2015/0256891 A1* | 9/2015 | Kim ....................... H04N 5/602 725/39 |
| 2015/0312608 A1* | 10/2015 | Higa ................ H04N 21/42225 725/13 |

OTHER PUBLICATIONS

Divakaran, Ajay, "Video Summarization and Indexing using Combinaton of the MPEG-7 Motion Activity Descirptor and other Audio-Visual Descriptors," Evolutionary Trends of the Internet: Thyrrhenian International Workshop on Digital Communications, Sep. 9, 2002, pp. 1-8.
European Search Report—EP Appl. 15189947.3—dated May 10, 2016.
Feb. 8, 2019—European Office Action—EP 15189947.3.
Nov. 26, 2019—European Office Action—EP 15189947.3.
Feb. 19, 2021—European Summons to Oral Proceedings—EP 15189947.3.

* cited by examiner

IDENTIFYING ONE OR MORE EVENTS IN CONTENT

RELATED APPLICATIONS

This application is a continuation of and claims priority to U.S. patent application Ser. No. 16/845,876, filed Apr. 10, 2020, which is a continuation of U.S. patent application Ser. No. 15/480,694, filed Apr. 6, 2017 (now U.S. Pat. No. 10,657,653), which is a continuation of U.S. patent application Ser. No. 14/514,602, filed Oct. 15, 2014 (now U.S. Pat. No. 9,646,387), each of which is hereby incorporated by reference in its entirety.

BACKGROUND

Content providers have long sought to better assist users in navigating through and selecting content to consume. A user may find it difficult to fast-forward through recorded content to find and view important events in the recorded content. There remains an ever-present need to help simplify the user's process of finding a desired portion of content being consumed.

SUMMARY

The following summary is for illustrative purposes only, and is not intended to limit or constrain the detailed description.

Features described herein relate generally to identifying the time or frame segment of a piece of video content that corresponds to an event identified by metadata describing events in the video content. For example a metadata service provider may provide a data stream identifying various events in a content item (e.g., a show or program). The data stream may indicate that a first event began at a first time, and another began at a second time. The data stream may identify the type of event and a general indication of when the event occurred, but the data stream might not identify the specific video frame at which the events occurred, because the metadata service provider might not know the details of the video stream containing the show or program. For example, different broadcasters transmitting content in different markets may have different delays or offsets in their video broadcast—one broadcaster may have inserted an extra commercial before starting the content, resulting in a 30-second delay in their content broadcast. Another broadcaster may have inserted a shorter, 15-second commercial, while a third broadcaster might not have inserted any commercial. Furthermore, all of the broadcasters may be implementing a few seconds of video delay (e.g., to allow time for censoring of unintended images occurring at live events), but the amount of time may vary slightly between different broadcasters. Features described herein allow a content analyzer computing device to use the metadata stream to identify events in a video stream, and then to use predictive motion processing of the video images to identify the frame boundaries for the events identified in the metadata stream.

In some embodiments, the content analyzer computing device may receive a metadata stream identifying classes or types of events occurring in a corresponding video program. For each class or type of event, the content analyzer may have previously stored information identifying expected types of motion or visual cues corresponding to the class or type of event. When the metadata indicates that a particular type of event occurs around a point in the content stream, the content analyzer may process the images in the video program, looking for the expected type of motion for the event, and may identify the individual frames in which the identified/indicated event occurs.

The content analyzer may store information identifying expected motion or visual cues for a wide variety of events in a wide variety of video program types, and may process various types of programs to identify frame boundaries for specific events. This boundary information may then be used to allow users to quickly jump to events of interest when viewing the video program.

Accordingly, one or more aspects of the disclosure provide for a method that may include receiving, by a computing device, metadata identifying an event occurring in a video program, and determining an expected motion of objects in the identified event. The method may also include analyzing, by a computing device, motion energy in the video program to identify video frames in which the event occurs, and storing information identifying the video frames in which the event occurs.

One or more aspects of the disclosure also provide for a method that may include receiving, by a computing device, metadata identifying one or more events occurring in a video program, and determining first and second display views associated with the one or more events. The method may also include analyzing motion energy in the video program based on the first and second display views to identify at least one set of video frames in which the one or more events occur; and storing information identifying the at least one set of video frames in which the one or more events occur.

One or more aspects of the disclosure also provide for a method that may include receiving, by a computing device, metadata identifying one or more events occurring in a video program; determining at least one set of video frames in which the one or more events occur based on a correlation between an expected motion of objects associated with the one or more events and one or more movement patterns identified in the video program; and storing information identifying the at least one set of video frames in which the one or more events occur.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
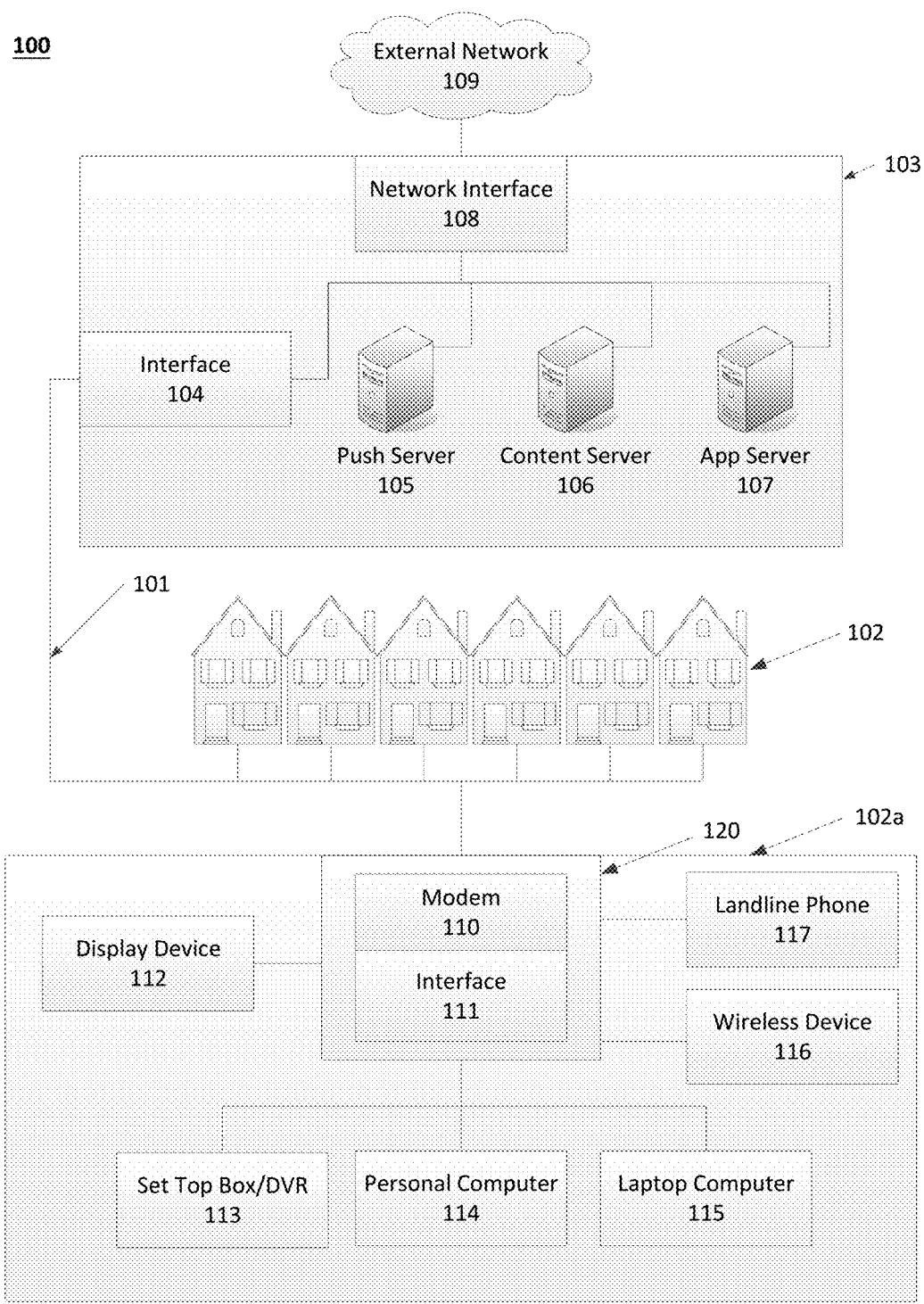
FIG. 1 illustrates an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one or more links 101 originating from the local office 103, and it may be split a number of times to distribute the signal to the various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of the links 101 than before.

The local office 103 may include an interface 104, such as a termination system (TS). More specifically, the interface 104 may be a cable modem termination system (CMTS), which may be a computing device configured to manage communications between devices on the network of the links 101 and backend devices such as the servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include one or more push notification servers 105. The push notification server 105 may generate push notifications to deliver data and/or commands to the various premises 102 in the network (or more specifically, to the devices in the premises 102 that are configured to detect such notifications).

The local office 103 may also include one or more content servers 106. The content server 106 may be one or more computing devices that are configured to provide content to users at their premises. This content may be, for example, advertisements (such as commercials), video on demand movies, television programs, songs, text listings, etc. The content server 106 may include software to validate user identities and entitlements, to locate and retrieve requested content, to encrypt the content, and to initiate delivery (e.g., streaming or downloading) of the content to the requesting user(s) and/or device(s). The content server 106 may also be configured to generate advertising decisions and rules, and transmit them to a requesting user or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. As another example, the application server or another server may be responsible for monitoring user viewing habits and collecting that information for use in selecting advertisements. As another example, the application server or another server may be responsible for formatting and inserting advertisements in, for example a video stream being transmitted to the premises 102. Yet the application server or another application server may be responsible for associating interactive components into and with content and/or advertisements. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111, such as a gateway, may be a computing device that communicates with the modem(s) 110 to allow one or more other devices in the premises 102a, to communicate with the local office 103 and other devices beyond the local office 103.

The gateway interface device 111 may be a set-top box, digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), the additional set-top boxes or the DVRs 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
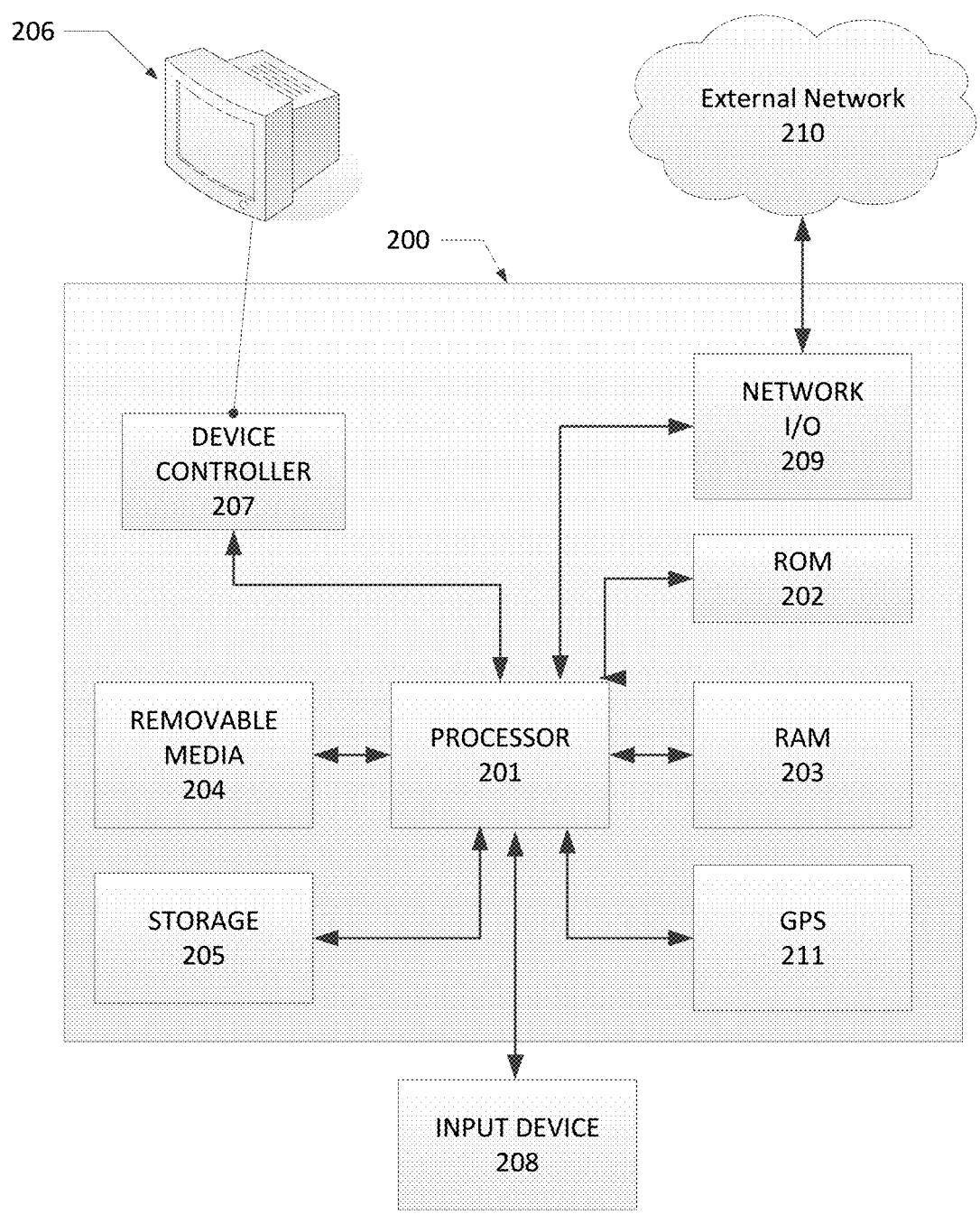
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) storage 205, such as a hard drive. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

FIG. 2 shows an example hardware configuration. Modifications may be made to add, remove, combine, divide, etc., components as desired, and some or all of the elements may be implemented using software. Additionally, the components illustrated may be implemented using basic display devices and components, and the same components (e.g., the processor 201, the ROM 202, the display 206, other input/output devices, etc.) may be used to implement any of the other display devices and components described herein. For example, the various components herein may be implemented using display devices having components such as a processor executing computer-executable instructions stored on a computer-readable medium (e.g., the storage 205), as illustrated in FIG. 2.

Having described examples of network environments and content consumption devices that may be used in implementing various aspects of the disclosure, several examples will now be described in greater detail illustrating how a display device may monitor user actions during an advertisement, a display device may restrict a user's control of the display device during an advertisement, and efficacy file reports are created and used. The consumption device, which may be a user's tablet computer, personal computer, smartphone, DVR, or any other computing device as described herein, may monitor any client-side interaction with the user during an advertisement, such as detecting a change in audio level or order of display elements. In other examples, the display device may prohibit a user from muting an advertisement during play.

Figure 3:
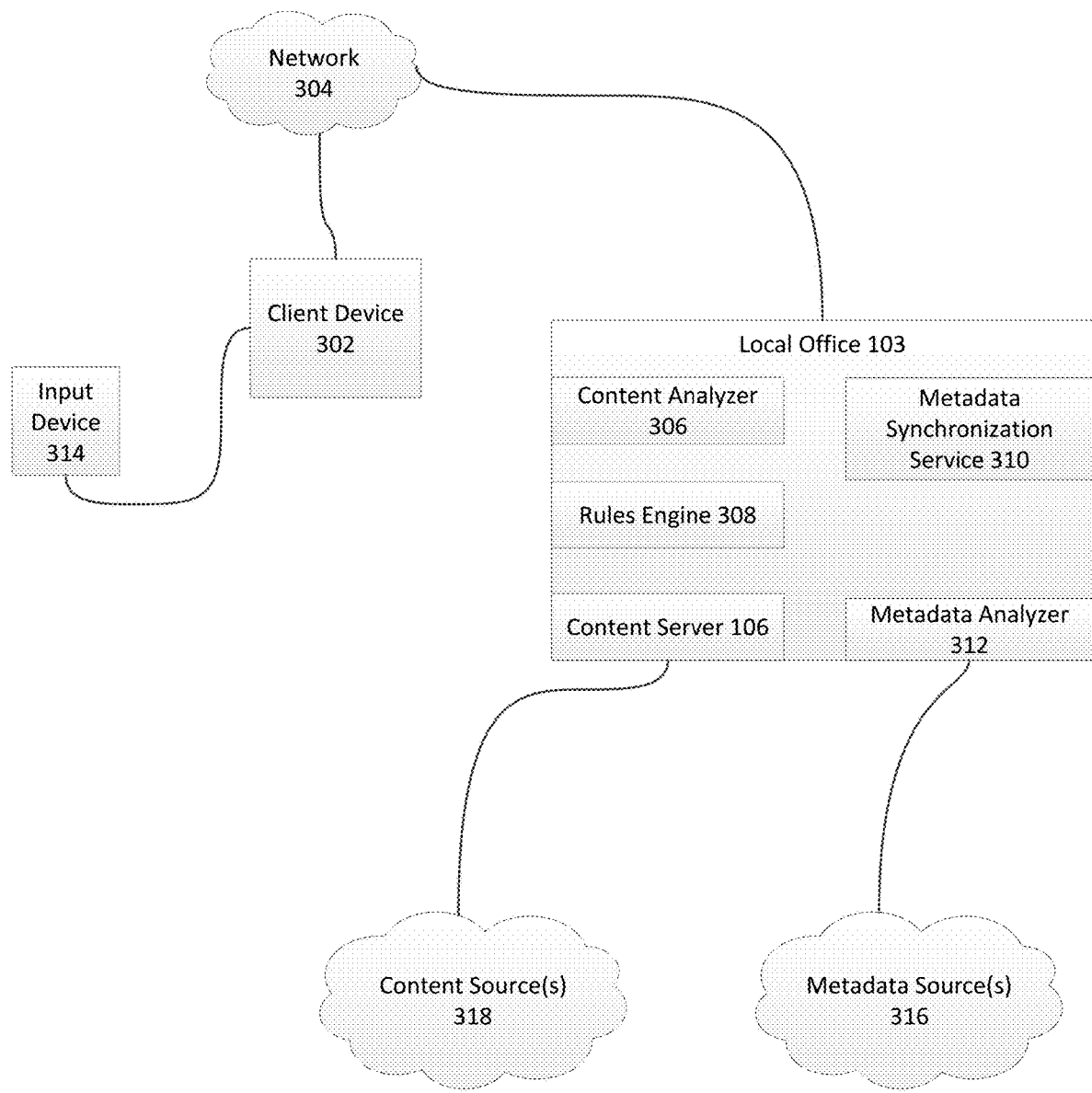
FIG. 3 illustrates an example system in accordance with aspects of the present disclosure.

FIG. 3 illustrates an example system 300 in accordance with one or more disclosed features described herein. The system 300 may include a client device 302. The client device 302 may comprise, be substantially similar to, and/or be the same as computing device 200, as shown in FIG. 2. The client device 302 may comprise, for example, a set-top box 113, a personal computer 114, a laptop computer 115, an interface device 111, a modem 110, a display device 112, a landline phone 117, a wireless device 116, a mobile device (smartphone, tablet, smartwatch, Bluetooth, etc.), a digital video recorder (DVR), a digital video player, an audio device, or any other device capable of providing or accessing media and/or content, or combinations thereof.

The client device 302 may be operably connected to an input device 314, which may comprise a remote control, keyboard, mouse, touch screen, microphone, or the like. Input device 314 may be used to control and access features (e.g., related to content) of the client device 302. Input device 314 may comprise, be substantially similar to, and/or be the same as input device 208, as shown in FIG. 2. One or more users may interact with input device 314 and/or the client device 302, such as when a user accesses content on the client device 302.

The client device 302 may be operably connected to the local office 103 (or other entity) via a network 304. The network 304 may comprise, be substantially similar to, and/or be the same as network 100, link 101, external network 109, and/or external network 210 as shown in FIGS. 1 and 2. The network 304 may be, for example, a wireless network, DOCSIS network, a MoCA in-home coaxial cable network, a cellular network, an Ethernet network, a Wi-Fi network, and the like.

The local office 103, which may be associated with a head end, may provide content to the client device 302 via the network 304. The local office 103 may include a content analyzer 306, a rules engine 308, a metadata synchronization service 310, a metadata analyzer 312, and a content server 106 (as previously shown in FIG. 1), all of which may be servers or other computing devices. The local office 103 may also access and retrieve (e.g., via the content server 106) content from one or more metadata sources 316 and one or more content sources 318. It is noted that whenever the local office 103 may be referenced herein as performing an action or step, any device (or combination of devices) that is included in (and/or associated with) the local office 103 (e.g., the content analyzer 306, the rules engine 308, the metadata synchronization service 310, the metadata analyzer 312, and the content server 106, application server 107, etc.) may perform such action or step. It is also noted that any reference herein to the local office 103 may be a reference to any device (or combination of devices) that is included in (and/or associated with) the local office 103.

Each component of the system 300 may be operably connected to and/or interact with each other via a direct and/or indirect connection, such as via a network or hardwire. Each component of the system 300 may be affiliated, operably connected to, and/or located at a service or content provider, such as the local office 103.

FIG. 3 illustrates one client device 302, however, any number of client devices, such as two, ten, or a hundred, may be included in the system 300 and/or in any of the embodiments disclosed herein. The client device 302 may be located at a location, such as premises 102a. Additionally, multiple client devices 302 may be located at a same or similar location, such as premises 102a, or may be located at different locations. The client device 302 may provide and/or access content services, such as video/image content services, audio content services, internet content services, and the like. The client device 302 may access content services and other services via, for example, a video processor or audio processor (e.g., similar to device controller 207) and may display content on a display (e.g., similar to display 206 as shown in FIG. 2). In some embodiments, the client device 302 may launch an application on the client device 302, and access content via the launched application.

The client device 302 may access content on any number of content platforms, which may include a linear content platform (e.g., broadcast television, scheduled multicast transmission of content, etc.), media (video/audio) on-demand content platform, mobile content platform, a service provider-specific content platform, an online content platform, or other content platform that may be capable of providing content on the client device 302, or combinations thereof. For example, the client device 302 may be a mobile device, and may provide content, such as a movie, through a mobile application. In such a scenario, the content may be provided through a mobile content platform. In another example, the client device 302 may be a set-top box, and may provide linear content, such as a sports program or other live program (e.g., live broadcast). In such a scenario, the content may be provided through a linear content platform.

In some embodiments, the client device 302 (e.g., via a DVR) may record content that may be accessed at a later time. In yet another example, the client device 302 may be a set-top box, and may provide content, such as a sports program or other content, using a media on-demand content platform (e.g., video on-demand), and/or may provide content, such as an internet video, using an online content platform.

A service provider may provide content that may be specific for that service provider with the service provider's own content platform. For example, content provided on a service provider content platform may be customized by a service provider (e.g., the local office 103) for a particular client device and/or user, such as providing a particular segment of a sports program, user's favorite part of a sports program, recommended segment of a sports program, and the like. Additionally, content provided on a service provider content platform may be a combination of various other platforms, such as combining online content with linear or video on-demand content.

Users may access content from the client device 302. For example, a user may request access to a football game on a set-top box, and subsequently watch the football game on a display connected to the set-top box. In this example, the user may use an input device 314 (such as a remote) to access the football game on the client device 302.

The local office 103 may offer, via a termination system 104 (e.g., cable modem termination system), both multicast and unicast content transmissions to receiving devices, such as the client device 302. Transmissions to receiving devices may be composed of content streams which may be composed of one or more frames, such as a series or sequence of frames of content.

The content analyzer 306 may be a computing device, such as that shown in FIG. 2, configured to analyze the video content from either a multicast or unicast transmission to identify the frames that correspond to an event identified in metadata describing events in the video content. Content analyzer may analyze motion of objects displayed in content. The content analyzer 306 may use content scheduling information to obtain the timing schedules of various programs. The content analyzer 306 may then obtain and analyze video from a multicast transmission at a scheduled time. For example, after the client device 302 begins recording a live football game on a particular channel with a DVR, the content analyzer 306 may determine the particular channel/station and the location associated with the station (e.g., channel 5 in Washington, D.C.). The content analyzer 306 may determine this information due to broadcasts of some content, such as football games, may dependent on location. The content analyzer 306 may then use scheduling information to determine that the DVR is recording this particular football game on this channel in this location.

The content analyzer 306 may analyze content obtained from the multicast transmission, such as the football game, based on information stored in the rules engine 308. The rules engine 308 may be a memory that contains rules for analyzing content, and such rules may be based on identifying events in the content. Each event may be based on a content type or genre. This will be explained below in more detail. Examples of content types may be football, baseball, sitcom, awards show, reality show, game show, and the like. Examples of events, which may be information identifying specific events in a program corresponding to a content type, such as an offensive play in a football game, an offensive play in a basketball game, a running or passing play in a football game, a pitch in a baseball game, a kickoff in a football game, a shot on goal in a soccer game, awarding of an Academy Award or other award, a slam dunk in a basketball game, a fast break and subsequent shot on goal in a hockey game, answering a question on a game show, and any other classification of an event that can be made of content.

Rules may describe the expected motion of objects and/or people in a particular type of event in a program. For example, an expected motion for a pass play (event) in a football game (content type) may include first a series of frames where both teams (i.e., objects in the frames/content stream) move to line up in a substantially straight line (e.g., the line of scrimmage), then a series of frames of substantially little to no motion in the content stream (e.g., right before the quarterback snaps the ball). The expected motion for the pass play may then include a series of frames where players begin to move (e.g., the start of the action in the pass play, where the defensive players may move in one direction and the offensive players may move horizontally in a substantially opposite direction), then a series of frames of substantial movement of the players (e.g., the subsequent catch of the football), and then frames of random movement and/or substantially little to no motion (e.g., after a tackle when players are moving in different directions over the field or beginning to huddle again, or in the case of a touchdown pass play where there is little to more motion). The expected motion may depend on the computational ability of the content analyzer 306. If the content analyzer 306 is able to identify individual players through facial and/or jersey recognition, and identify the individual football in the image, then the expected motion may be granular enough to identify the fact that for a pass play, a player on the offense is expected to catch the football after it is thrown by another player on the offense. However, if the content analyzer 306 is of lesser computational ability, which may be the case if the analysis is to be done quickly, then the expected motion may be more generic. For example, a simpler expected motion may simply indicate that many pixels on the left side of the screen move towards the right to start a play, pixels on the right move towards the left to start a play, and a fast camera pan in one direction results in an increase in the score by 6 (e.g., as illustrated in an onscreen character recognition process), or by spotting a referee making the touchdown signal. In addition to expected motion, rules may also describe expected environmental sounds (audio) for a particular type of event, expected display view or camera angles for a particular event, and/or expected display graphics for a particular event. Rules will be described below in more detail.

The local office 103 may determine information (e.g., metadata) describing content items using the metadata analyzer 312. The metadata analyzer 312 may be a computing device that may analyze content or may obtain metadata from one or more metadata sources 316. This metadata may include descriptive information for content, such as a time or date associated with an accessed content item, name or description of a content item, a content item's platform or channel, a content item's associated location (e.g., IP address), and the like. The content metadata may also include the content type (e.g., football, awards show, etc.) and identification of events occurring within that content type (e.g., pass play, or awarding an Academy Award). For example, metadata may include that a content item is a football game, the teams that are playing, and what type of play just happened.

Metadata may be generated by the metadata analyzer 312 and/or transmitted by the metadata sources 316 and received by the metadata analyzer 312 in substantially real time or at a later time. For example, during a live event, such as a football game, the metadata sources 316 may generate and transmit to the metadata analyzer 312 metadata describing each type of play, such as a pass play, run play, kickoff, interception, and the like. Metadata may also include a general description of how long an event took to complete, such as indicating that a football pass play took nineteen seconds to finish after the snap.

In one example, metadata may include information describing that a first pass play happened when the game clock went from 8:06 in the first quarter to 7:35 in the first quarter (31 seconds off the game clock), and team A is the offensive team and team B is the defensive team, and the pass was completed for 25 yards, and the like. The metadata may also describe a second pass play happened when the game clock went from 7:35 in the first quarter to 7:02 (33 seconds off the game clock) in the first quarter, and a touchdown happened (please note, this play has two events, a pass play event and a touchdown event). Thus, the metadata may label plays as continuous parts of a content stream as illustrated by the first play being associated with a game clock going from 8:06 to 7:35 (31 seconds), and the second play beginning right where the first play ended at 7:35 and ending at 7:02 (33 seconds).

The local office 103 may then use the information in the metadata (such as timing information, scoring information, etc.) to determine a "rough cut" portion of the content item's video stream that may contain an event of interest. A "rough cut" of the video stream may include one or more frames of content that include an event, but may also include one or more frames of content that might not constitute the actual action of the event (e.g., frames surrounding the action of the event or the event itself). For example, the metadata may indicate that a touchdown event happened in the first quarter between 7:35-7:02 on the game clock. In such cases, the local office 103, via the metadata synchronization service 310, may use OCR on a game clock to find the video frames (the rough cut) that show the game clock between 7:35-7:02. These frames (the rough cut portion) may include acts that may constitute the actual event or action of the event, such as the snapping of the ball, the catching of a pass and subsequent run by a player, and the player making it to the end zone. These frames (the rough cut portion) may also include acts that might not constitute the actual event or action of the touchdown event, such as players moving to their respective huddles, coming out of their huddles, lining up along the line of scrimmage, the touchdown celebration, the official review to determine if it was an actual touchdown, and then more celebration after confirmation of the score. This will be discussed below in more detail.

The content analyzer 306 may analyze and detect motion and other aspects of a rough cut sequence of frames of an event, such as a football pass play, based on rules corresponding to the event to determine the frames of interest (e.g., the frames showing the actual event or action of the event). For example, the content analyzer 306 may detect the start of a play by determining motion patterns in the sequence of frames and may use the rules to determine acts in a play, such as the starting or stopping of the action in a play (e.g., from the moment the football is snapped until the player with the football is tackled). In such a case, the content analyzer 306 may examine the rules to determine an expected motion of a pass play (e.g., an event within the football content type). Based on those rules, the content analyzer 306 may delimit, identify, and/or extract portions of the rough cut sequence of frames (e.g., determine boundaries of a play). For example, the content analyzer 306 may determine which frames in the stream of frames includes the start of the action in a football pass play by determining the frames indicating little to no movement on the field and subsequent frames indicating horizontal motion in opposite directions. The content analyzer 306 may also use other characteristics from a content stream, such as camera motion, graphics (e.g., game clock or scoreboard), and the like to determine the frames of interest. These concepts along with analyzing motion will be described below in more detail.

Figure 4:
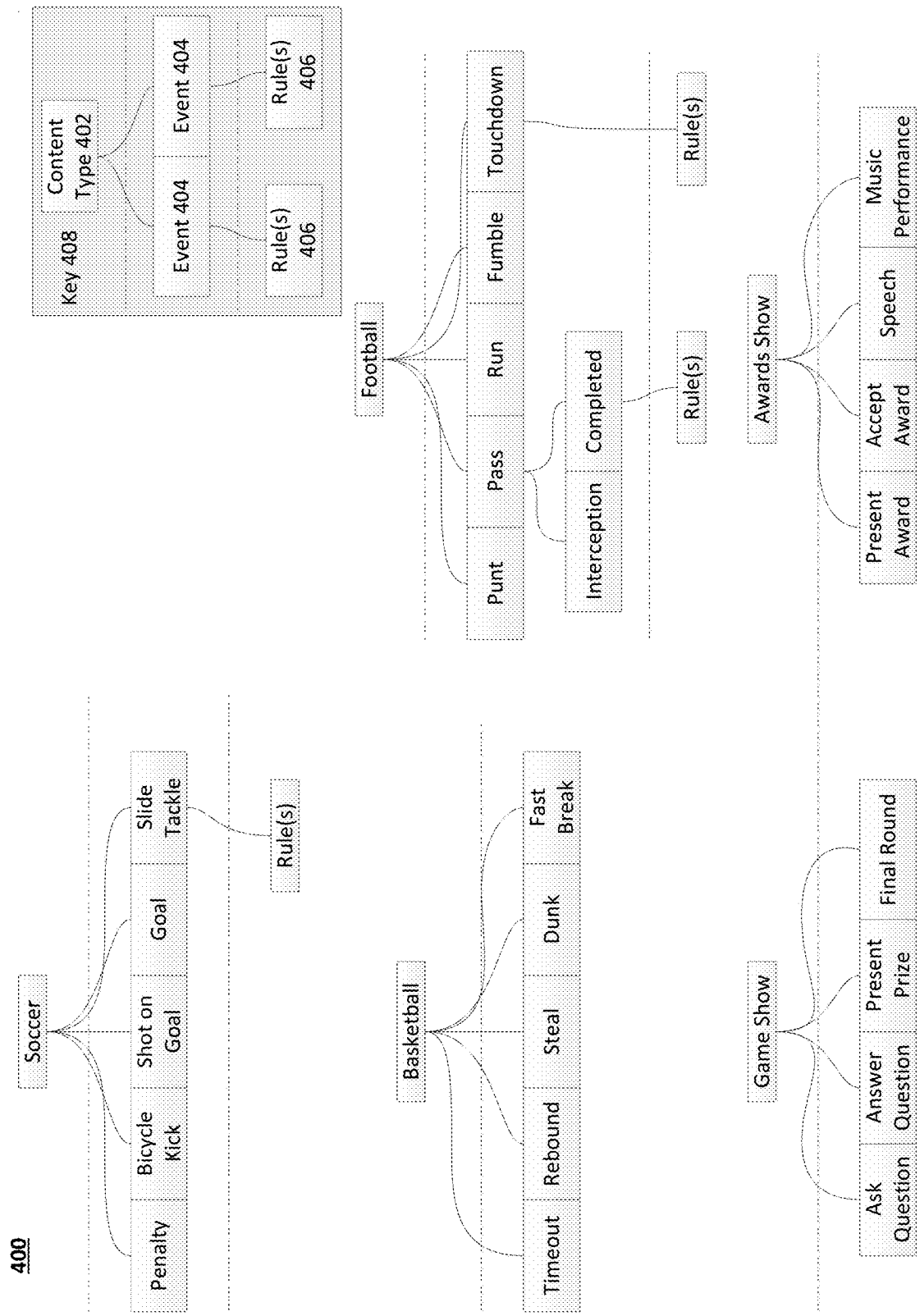
FIG. 4 illustrates an example diagram in accordance with aspects of the present disclosure.

FIG. 4 illustrates an exemplary hierarchy arrangement 400 between one or more content types 402, one or more events 404, and one or more rules 406 (shown by key 408). According to some aspects, the local office 103 or other entity (e.g., content provider, user device, server, data provider, etc.) may determine or obtain information regarding content types, events within those content types, and rules for each event, in which the local office 103 or other entity may use to determine the frames of interest in content. Each type of event 404 may correspond to one or more rules 406. The rules 406 may indicate visual and/or audio characteristics of events to aid in identifying the event's frames in the content, and may be stored in the rules engine 308, and after the local office 103 or other entity receives or generates metadata indicating the content type 402 and/or the event 404, the local office 103 may retrieve the corresponding rules 406. It is noted that while FIG. 4 illustrates an exemplary number of content types, events, and rules, the local office 103 or other entity may determine any number of content types, events, and rules, and any number of content types, events, and rules may be used according to the aspects disclosed herein. Even though not illustrated, each event may correspond to at least one rule. In some embodiments, users may input the rules 406 into the local office 103 or other entity. Alternatively, the local office 103 or other entity may create and develop the rules 406 by analyzing a content item's metadata and content streams. In some embodiments, events 404 may be further defined into subevents. For example, a set of frames may be classified as a pass play event, but may further be subclassified as an interception or completed pass subevent. An example of this is illustrated in FIG. 4, where for the football content type, a pass event is further subclassified into an interception pass event and a completed pass event.

The content type 402 may identify the general subject matter or genre of a content item. Examples of content type may be baseball, football, soccer, awards show, reality show, game show, news, etc. As shown in FIG. 4, many types of events 404 (e.g., timeout, rebound, steal, dunk, fast break, etc.) may be defined as occurring within a content type 402 (e.g., basketball).

As shown in FIG. 4, the content type football includes one or more events (or subevents), such as punt, pass, interception, run, fumble, touchdown, and the like. The event for a particular content type may be customized according to the subject matter of the content type. As stated above, a user may input rule, event, or content type information into the local office 103, which may enable the local office 103 to retrieve the rules 406 corresponding to a retrieved content item's type and/or event. Additionally, the local office 103 may determine an event based on analyzed video (e.g., provided by the content analyzer 306) and/or analyzed metadata (e.g., provided by the metadata analyzer 312). In some embodiments, the local office 103 may determine an event using metadata provided by a metadata source 316. For example, the metadata source 316 may transmit a content type of a football game and an event 404 of "pass play" along with other metadata (such as approximate timing information for that pass play) from a football game. As shown in FIG. 4, examples of events may include fast break, shot on goal, goal, fumble, rebound, timeout, ask a question, answer a question, presenting an award, speech, and the like.

The one or more rules 406 may describe likely or expected action and/or motion in a sequence of one or more frames that are associated with a particular event 404. The local office 103 may obtain the expected motion for each event 404 by user input.

Accordingly, the rules 406 may describe the underlying contextual information and/or subject matter of a content item. The rules 406 may also describe expected environmental sounds for a particular type of event, expected display view or camera angles for a particular event, and expected display graphics for a particular event. For example, the rules 406 for the touchdown event 404 may include what a touchdown event looks like (e.g., the motion profile and/or energy of a touchdown play), what sounds happen in the touchdown event (e.g., a whistle at the end of a play, cheers from the crowd, commentator making comment about touchdown or score, etc.), display views for a touchdown event (e.g., wide camera angle first, then zoom in on a player making the touchdown, etc.), and display graphics for a touchdown event (e.g., the clock stops after making the touchdown, the score of one team goes up by six points, etc.).

In one example of the local office 103 using expected display graphics for an event, the rules 406 may include that if the score goes up by three (e.g., using OCR on the displayed graphics), then the play may be complete (e.g., action has stopped) at that frame in the video stream corresponding to the score going up by three. In this example, the play may be classified as a field goal event. Additionally, the rules 406 may include that if the score goes up by one, then the play may be complete at that frame in the video stream, the play may be classified as an extra point attempt event, and the previous play in the sequence may be classified as a touchdown event. In an example of the local office 103 using expected sound or audio for an event, the rules 406 may include that after the commentators of a football game say that the player dropped the pass, the play/event may be complete at that frame in the video stream, and the play/event may be classified as a pass play event. In an example of the local office 103 using the expected display view for an event, the rules 406 may include that if the camera goes from motionless to panning across the football field, then the action in the play may be on going (e.g., the event might not be complete). Further, the rules 406 may include that when the panning stops, the play may be complete at that frame in the video stream.

In some embodiments, the rules 406 may depend on the computational ability of the content analyzer 306. For example, the content analyzer 306 may be capable of determining a motion profile on a pixel scale or level, and thus may be able to determine motion of individual displayed objects, such as faces, body parts, footballs, baseball bats, basketball hoop nets, trophies, and the like. In such situations, the expected motion (e.g., the rules 406) may correspond to such computational ability of the content analyzer 306, and may include the motion of individual objects displayed in the frames, such as players, officials, jerseys, etc. Alternatively, the content analyzer 306 might not be capable of determining a motion profile on a pixel scale, and may instead be capable of identifying wider areas in the frames of content that may comprise a plurality of pixels. In such situations, the expected motion may correspond to such computational ability of the content analyzer 306, and may include the motion of blocks of pixels displayed in the frames that describe motion in a general portion of the frames instead of motion of a particular object displayed in the frames. In some embodiments, the rules for a particular event may identify only a very general characteristic (e.g., most of the screen moves left).

In another example, the rules 406 for a touchdown event may include that motion of the players, or the camera's focus and the general motion of pixels, generally stops in an end zone. In yet another example, rule 406 for a field goal event may include that the players line up with two players in the back field with one player moving towards another kneeling player. In yet another example, the rules 406 for a soccer goal event in soccer may include displaying a zoomed-in display of the net and the crowd, a dribbling event in soccer may include a display of the soccer field in a wide, horizontal view.

According to some aspects, when the content analyzer 306 may analyze a pass play content stream (or any other type of content stream), the content analyzer 306 may analyze the motion, display view or camera angle, sounds, and graphics in the frames of the content stream that substantially correlate and/or match the rules (e.g., the expected motion of players and other objects in the frames) for the pass play event 404. This will be further discussed below in more detail.

Figure 5:
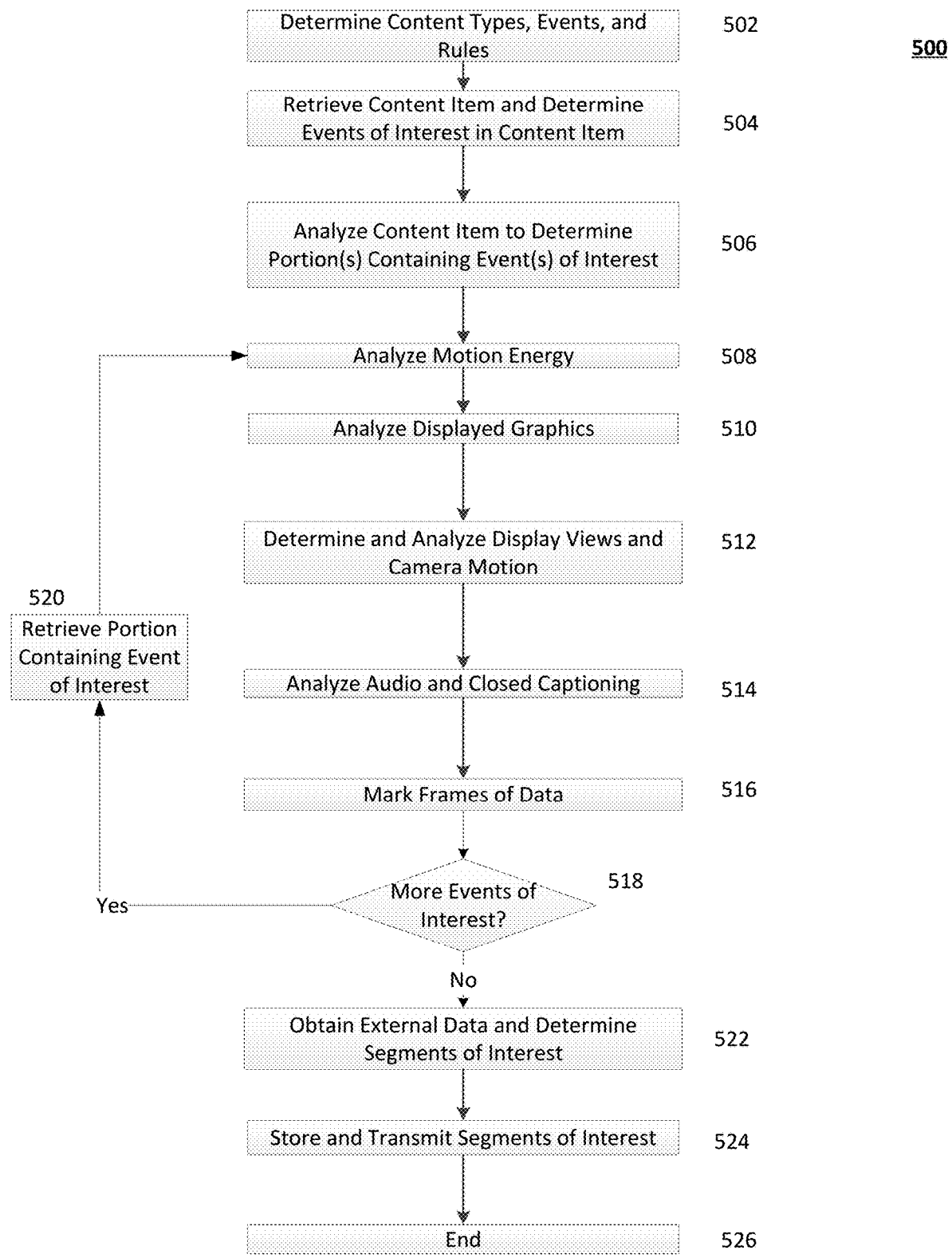
FIG. 5 illustrates an example flow diagram of a method in accordance with aspects of the present disclosure.

FIG. 5 is an exemplary flow diagram illustrating an example process 500 in accordance with one or more disclosed features described herein. In one or more embodiments, the process illustrated in FIG. 5 and/or one or more steps thereof may be performed by one or more computing devices (e.g., input device 314, the client device 302, the local office 103, content providers, data providers, servers, and the like). In other embodiments, the process illustrated in FIG. 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order. In the example provided, the process 500 may begin with step 502, in which the local office 103 may determine or obtain information regarding content types, events within those content types, and rules for each event.

At step 504, the local office 103 or other entity may retrieve a content item using the content analyzer 306. The local office 103 may retrieve a content item from a multicast or unicast transmission. Additionally, the client device 302 may access the retrieved content item. In some embodiments, the client device 302 may access a content item using either a linear platform (e.g., watching a live broadcast of the content item), on-demand platform (e.g., video on-demand provided by the local office 103), or a DVR platform (e.g., recording the content item with a DVR). For example, the client device 302 may access a live broadcast of a football game shown on a local broadcast channel, and subsequently my record it with a DVR. The local office 103 may then access and retrieve the football game from a multicast transmission of the football game for that particular channel. Such multicast transmission may be for transmission to a local area (e.g., some sporting events may be transmitted to a local geographical area, while some other sporting events may be transmitted to a wider geographical area). In some aspects, the content analyzer 306 may obtain a schedule of content from a scheduling guide, and then retrieve content based on this schedule. Such a schedule may be created by the local office 103 and then transmitted to the client device 302.

Also at step 504, the local office 103 or other entity may determine events of interest in the metadata, which may be the events 404 the local office 103 or other entity may locate, extract, and/or flag in the retrieved content item. For example, for a content type of a football game, the local office 103 may wish to determine/identify all touchdown events, all pass plays resulting in a gain of 20 yards, all running plays resulting in a gain of 10 yards, any sack, any interception, any fumble, and the like. Thus, the local office 103 may know all the types of events 404 it is looking for in the retrieved content item. In some embodiments, a user may input the events for which the local office 103 may be looking for in the retrieved content item. In other embodiments, some events 404 may carry greater precedence than other events 404. For example, a pass play in a football game resulting in a touchdown may have greater precedence than a pass play that might not result in a touchdown. Additionally, a running play in a football game resulting in a first down may have greater precedence than a running play that might not result in a first down or touchdown. Thus, the local office 103 may establish a hierarchy of key events based on the specific rules and guidelines of each event (e.g., each play). The local office 103 may then look for events 404 in the retrieved content item based on this hierarchy (e.g., flagging or extracting all the top rated events 404, but a few or none of the lower rated events 404).

At step 506, the local office 103 or other entity may analyze the retrieved content item using descriptive information (e.g., metadata) corresponding to the retrieved content item to identify portions of the content item containing the events of interest. In some cases, the local office 103 may analyze and/or look through the metadata to determine whether the metadata includes descriptions for the events of interest that the local office 103 may be looking for in the retrieved content item. For example, the local office 103 may analyze the metadata to compare a list of events that occurred somewhere in the content item to the events of interest the local office 103 is searching for in the content item.

Thus, after locating an event of interest in the metadata, the content analyzer 306 may analyze the video stream of a content item to generally focusing in on a portion (e.g., rough cut portion) of the video stream that may include the frames of an event of interest. The local office 103 may use the information in the metadata (such as timing information, scoring information, etc.) to determine this "rough cut" portion of the content item's video stream that may contain an event of interest. A "rough cut" of the video stream may be one or more frames of the video stream that contain an event or action of the event, but may include one or more frames of content that might not constitute the actual event or action of the event. For example, a rough cut of a touchdown event may include the frames of data that show the players moving to their respective huddles, coming out of their huddles, lining up along the line of scrimmage, the snapping of the ball (e.g., the start of the action of the play/event in this example), the catching of a pass and subsequent run by a player, the player making it to the end zone (e.g., the end of the action of the play/event in this example), the touchdown celebration, the official review to determine if it was an actual touchdown, and then more celebration after confirmation of the score.

The content analyzer 306 may determine this rough cut by determining characteristics of a content stream, such as camera motion, audio/closed-captioning, display view (camera angle), on screen graphics (e.g., game clock or scoreboard), motion of objects in the content stream, and the like. The local office 103, via the metadata synchronization service 310, may then correlate these video characteristics to the information in the metadata to find the rough cut in the video stream that includes the event (e.g., action of the play). For example, if the metadata for a football game indicates that a touchdown play began at 7:35 in the first quarter, the content analyzer 306 may first determine from the metadata that the event is a touchdown, and then may retrieve from the rules engine 308 the rules for the touchdown event. The content analyzer 306 may then perform optical character recognition on the content stream to determine when the game clock shows 7:35 in the first quarter. Thus, in this example, the "rough cut" of the video stream may begin with a frame of the video stream that shows the game clock showing 7:35 in the first quarter. If, for example, the game clock might not be visible at 7:35 in the first quarter (e.g. a different display view might not show the game clock, etc.), the content analyzer 306 may find the frame location in the video stream that displays a game clock of greater than 7:35 (e.g., 7:40) and a frame location that displays a game clock of less than 7:35 (e.g., 7:32), and the metadata synchronization service 310 may assign the beginning of the "rough cut" to one of the frames between these two frame locations. Continuing with this example, to find an end frame location of the "rough cut," the content analyzer 306 may know from the metadata that the end of the touchdown play happened when the game clock displayed 7:02 in the first quarter. Thus, the content analyzer 306 may perform optical character recognition on the content stream to determine a frame location in the video stream when the game clock shows 7:02 in the first quarter. This frame location may be the end of the "rough cut" of the video stream.

The metadata synchronization service 310 may use the metadata to align information in content's metadata with the frames of a content stream or transmission. As stated above, optical character recognition software (OCR) may be used to analyze and determine text, shapes, people, or other objects appearing in the frames of a content stream. In one example, the content analyzer 306 may use OCR to determine the location of a game clock/score board displayed in the frames of a content stream of a sporting event and may also determine what is displayed on the game clock. The metadata synchronization service 310 may then be able to use information displayed on the game clock (e.g., the game time) to align the game time from the metadata with the frames in the content stream that display that game time. Thus, as the client device 302 records a football game using a DVR, for example, the client device 302 may insert timestamps in the video stream to create a content steam time index. The metadata synchronization service 310 may then extract those timestamps to identify a location in the content stream, thus allowing the metadata synchronization service 310 to correlate those timestamps with the timing information obtained from the metadata (e.g., the game time) and/or a game time determined from the displayed game clock. In some embodiments, one or more external metadata sources 316 (e.g., Stats, Inc.) may provide metadata that includes timing information (e.g., the game time during the game) of when certain events/plays occurred (e.g., a touchdown pass play happened between 07:35 to 07:02 in first quarter), but these external metadata sources 316 might not provide any information correlating the game time to the content stream time index. Thus, based on the above information, the metadata synchronization service 310 may correlate the timing information (or any other information obtained from the metadata), such as game time, with the data stream time based on the extracted timestamps.

The frames of content showing the above touchdown pass play of 33 seconds (between 07:35 to 07:02 in first quarter) may include other events (such as substituting players, huddling with your team, getting lined up, celebrating after the touchdown, review of the touchdown, and the like) that might not constitute the frames of interest or the actual action of the play (e.g., the frames showing just the hiking of the football and the subsequent action and motion until the touchdown is made). The actual action of a play in football may generally last 3 to 10 seconds. Thus, as shown above, the metadata might not specifically indicate which frames include the actual action of the play, and the content analyzer 306 may find a wider "rough cut" of the video stream that includes the actual action of a play/event. The content analyzer 306 may then analyze this "rough cut" in accordance with the rules for the particular event to provide a refined, precise sequence of frames showing the actual action of the play (e.g., from snap of the ball to the score).

The local office 103 may receive metadata from the metadata sources 316 and subsequently process the received metadata using the metadata analyzer 312. Alternatively, the local office 103 may analyze the retrieved content and determine metadata associated with that analyzed content. For example, the local office 103 may obtain the content type 402 of a content item by analyzing the content item's title (e.g., a title of "Seahawks vs. 49ers"). In another example, a metadata source 316 may transmit the content type 402 of "football" along with other metadata from a football game. The metadata information may include any information describing an associated content item. For example, the information (e.g., metadata) may include a title of the content item, a content type 402, an event 404, the rules 406 corresponding to an event 404, teams that are playing, timing information, the score, player names, weather, yards gained/lost, what type of play, whether a shot was a three point attempt, and the like.

Using the metadata and descriptive information, the local office 103 may then determine a content type 402 and an event 404 of a retrieved content item and/or rough cut portion of the content item. For example, after a metadata source 316 transmits to the local office 103 content information including a content type 402 of football and an event 404 of a pass play event, the local office 103 may associate the football content type 402 and the pass play event 404 with a rough cut portion of the retrieved content item that includes the pass play event. The local office 103 may then access the rules 406 for an assigned event 404 (e.g., pass play event). It is noted that a retrieved content item may be composed of one or more events. Additionally, the local office 103 may determine one or more rough cut portions of a content item that may correspond to those one or more events.

At step 508, the content analyzer 306 may then analyze motion energy, based on the rules 406, in a rough cut portion of the retrieved content item. In some cases, the content analyzer 306 may analyze motion energy over a series or sequence of frames, such that an object may appear to move over the course of an analyzed sequence of frames. In one example, a sequence of frames may be assigned a content type of football and an event of a pass play. The content analyzer 306 may then use the expected motion of football players (and other objects) described in the rules 406 for the pass play event 404 as a blueprint or framework for observing and analyzing motion of the players (and other objects)

in the sequence of frames to identify the specific frames where the play began and ended. Thus, the rules 406 may indicate to the content analyzer 306 what motion to look for in a sequence of frames. In some embodiments, the expected motion of an event may depend on the display view or camera angle of the analyzed frames. For example, the expected motion for a pass play shown in a wide angle view may be different than the expected motion of a pass play with a zoomed-in view. In some cases, the expected motion of an event may include multiple display views, such as a wide angle view at first and then a subsequent zoomed-in view. Thus, the rules 406 may take into account display views when analyzing frames of content and when applying the expected motion to the frames of content.

The content analyzer 306 may then identify/assign motion vectors to objects in the sequence of frames depending on the motion energy of the objects. Motion vectors may be composed of a magnitude component (e.g., how fast an object is moving) and a directional component (e.g., which direction the object is moving). For example, for a sequence of 1200 frames (e.g., a rough cut portion), content analyzer may determine a motion vector for objects over the entire sequence (e.g., 1200 frames) or a portion of the sequence of frames (e.g., frames 480 to 720 of the 1200 frames). The 1200 frames may be a rough cut portion that may include an event, such as a pass play. Thus, over a series of frames, a motion vector may indicate how quickly an object moves locations in the frames and in what direction the object moves in the frames.

Continuing to step 510, the content analyzer 306 may then analyze any graphics that may be displayed in the frames of the retrieved content item. Graphics may include text, numbers, scores, descriptions of objects, names, dates, clocks, and the like. These graphics may provide the content analyzer 306 visual clues and may aide the content analyzer 306 in delimiting content segments and/or frames (e.g., segmenting the frames of data showing the action of a football play). The content analyzer 306 may use optical character recognition to identify and analyze these graphics. Additionally, the rules 406 may include instructions regarding how the content analyzer 306 may processes, analyze, and/or use detected graphics for delimiting frames of content. The rules 406 may also include instructions for how the content analyzer 306 may use the detected graphics to delimit content segments and/or frames.

In one example, the content analyzer 306 may analyze graphics displayed in the frames a retrieved content item (football game) and may determine a location and pattern of the game clock. It is noted that many different events, such as most sporting events, use and/or display some type of clock or timing device. The content analyzer 306 may detect various characteristics for a game clock, such as background color, color gradient, font, and the like. The clock (or scoreboard) may include numbers (such as the score or time left in a quarter) and text (such as the names of the teams). The content analyzer 306 may determine the location of a game clock in a frame by determining the location of where numbers consistently appear in the frames of the content. A broadcast channel (e.g., NBC) may generally display a similar configured/stylized game clock/score board for subsequent games throughout a sports season. Thus, after the content analyzer 306 determines a game clock location for one broadcast channel, the content analyzer 306 may use that same (or substantially similar) game clock location in subsequent sports broadcast for that channel. In some cases, one broadcast channel may use a different configuration for their clock than another broadcast channel. Thus, the content analyzer 306 may determine a general location for a game clock for each broadcast channel. Additionally, the content analyzer 306 may determine a location for a play clock for a football game for a broadcaster. In such situations, the content analyzer 306 may use the presence of a game clock in determining that the action in a play is about to begin (e.g., the play clock may pop up on the screen with 5 seconds left on the play clock indicating that the action in a play is likely to begin within five seconds). In some situations, a broadcaster may display a game clock in different locations on the screen depending on the content type 402. For example, a game clock for professional football may be displayed in one location on the screen, while a game clock for college football may be displayed in a different location on the screen.

As stated above, the content analyzer 306 may determine the game time from the detection of a game clock. Thus, the rules 406 may include the fact that whenever the time on the game clock is counting down after the clock was previously stopped, the play or action of a play may be underway. Thus, this may be helpful in the analysis of frames and in the process of delimiting frames of content. Additionally, the local office 103 may use the time from the game clock to align metadata with frames of content. For example, metadata for a pass play event may include that the pass play occurred from 11:50 in the first quarter to 11:00 in the first quarter. Thus, the local office 103, via the metadata synchronization service 310, may correlate this timing information from the metadata with the frames displaying the detected game clock time showing the corresponding time.

In another example, the content analyzer 306 may analyze the score board of a football game and determine that the score for one team increased by 6 points. The rules 406 may include that after the content analyzer 306 determines that the score of one team in a football increases by 6 points, then the play may be complete at that frame in the video stream, and the play may be classified as a touchdown event.

It is noted that a game clock is used above as an example of analyzing graphics, but any other graphics may be analyzed at step 510. For example, the content analyzer 306 may analyze during an awards program a displayed graphic (e.g., text box) that may state "2014 Academy Award Winner for Best Actress." Thus, the rules 406 may include that after detecting this type of graphic, then the action of the event (e.g., the awarding of the 2014 Academy Award for best actress) may be happening or about to begin, and may mark a corresponding frame as such. In a game show example, the content analyzer 306 may detect graphics that show the points for each player (e.g., the point totals may be displayed), and may determine when an increase (or decrease) in those points takes place. Thus, the rules 406 may include that after an increase (or decrease) in a players point total, then an event (e.g., the asking and/or answering of a question in the game show) may have just completed, and the local office 103 may mark a corresponding frame as such. In a reality television example, the content analyzer 306 may analyze during a singing competition (e.g., "The Voice") a displayed graphic (e.g., text box) that may state a performer's name or song they are performing, which may allow for segmenting portions of the program that relate to individual (or groups of) contestants, songs, and the like.

At step 512, the content analyzer 306 may analyze the frames of a retrieved content item to determine display views associated with the frames and any changes or movement in these display views from frame to frame. These display views may be camera perspectives, such as a horizontal field perspective during the start of a football pass play, or a zoomed-in perspective, such as a camera zooming in on a player catching a pass. The rules 406 may include that a change in camera perspective may indicate a beginning or end of action in a play. For example, detecting that the display view changes from a wide horizontal perspective of a football field to a zoomed in display view may indicate that a tackle or touchdown has taken place, thus ending the action in a play. Such information regarding the display views and changes or movement in the display views may be found in the rules 406, and subsequently used by the content analyzer 306 to analyze the stream of content.

The content analyzer 306 may also analyze frame motion, such as resulting from camera panning or other camera movement (e.g., tilt, horizontal, zoom, vertical, or combination thereof). For example, during a football pass play event, the camera that is capturing the play may rotate horizontally to keep moving players in a middle portion of a frame. Thus, the content analyzer 306 may recognize that panning occurs in a series of frames, and may associate those frames with the action of a play (e.g., substantial movement), thus aiding the content analyzer 306 in the frame delimiting process. Additionally, if the content analyzer 306 detects panning, and then a change to little to no panning, this may indicate that the action of the play has stopped. If the content analyzer 306 detects little to no panning, and then detects an increase in panning motion, then this may indicate that the action of the play has started, and the local office 103 may mark a corresponding frame as such.

At step 514, the content analyzer 306 may analyze audio and/or closed-captioning information for the frames of a retrieved content item and, the local office 103 may delimit or mark frames based on the rules 406 describing expected audio and/or closed-captioning. In some embodiments, the content analyzer 306 may detect audio in a set of frames using speech recognition software. In one example, the rules 406 may include that detecting a whistle in a football game may indicate that a play is complete (e.g., the play is blown dead), that a player (e.g., quarterback) yelling to snap the football may indicate that a play is beginning or about to begin, or an announcer yelling "touchdown" may indicate that a play is complete (or detecting that the closed-captioning states that there was a touchdown). Thus the content analyzer 306 may delimit frames of the content item after the content analyzer 306 detects any one of these audio features in the frames.

The content analyzer 306 may derive closed-captioning from a content item or metadata associated with a content item, and may analyze the closed-captioning to determine the particular type of action in a series of frames. The rules 406 may include instructions regarding how the content analyzer 306 and the local office 103 may processes, analyze, and/or use detected audio and/or closed-captioning information for delimiting, marking, and/or extracting frames of content. For example, sports commentators may state during a series of frames that a football player passed the football to another player or that a touchdown happened. The content analyzer 306 may analyze the text from the closed-captioning of this speech, and the local office 103 may determine, based on the rules 406, that the beginning, action, or end of an event may be happening during the corresponding frames.

In another example, the content analyzer 306 may analyze audio or closed captioning of an awards show by determining when an announcer states that an award is being presented. In such cases, the corresponding frames may be marked as beginning an event for awarding that award. Also, the content analyzer 306 may detect when a speech by an award winner has completed, and may mark the corresponding frames as the end of an event for awarding that award.

At step 516, the content analyzer 306 may mark, determine, identify, extract, and/or delimit frames of data (e.g., the frames of interest that may show the action of an event) from the sequence of frames (such as a rough cut portion) based on a combination of one or more of the above video characteristics/features (e.g., motion energy, displayed graphics, display views/camera motion, and/or audio/closed-captioning). The content analyzer 306 may extract one or more frames from the sequence of frames, and such frames may be in a series or sequence, or may be random or sampled. The content analyzer 306 may extract frames based on (but may not be limited to) any information (or combination of information) determined in any of the steps of the process 500. Thus, for every event 404 that is classified, the corresponding rules 406 may indicate how each of the outputs from steps 508, 510, 512, and 514 (and any other information) may be combined, weighted, and/or prioritized when performing the segmentation or delimiting of frames of content. Stated differently, the general motion energy, onscreen text, and audio characteristics are all different characteristics that may provide hints as to the occurrence of an event, and the overall process may examine these characteristics individually, and may provide a weighting indicating the confidence level of the examination of each characteristic. For example, some rules may be less reliable than others in terms of identifying the event, so the examination and satisfaction of those rules may be given different weighting levels before the overall system determines the actual boundaries of the event.

In one example, the content analyzer 306 may delimit frames of a content item based on the rules 406 for an event 404 associated with the content item. The rules 406 may indicate that the start of action of a pass play may include one team lining up on one side of the line of scrimmage and the other team lining up on the other side of the line of scrimmage. The rules 406 may further indicate that after the teams line up along the line of scrimmage, there is substantially no motion energy on either side of the line of scrimmage, and then a sudden change in motion of the players. The rules 406 may further indicate that the moment of the sudden change in motion of the players indicates the start of the action of the pass play. Accordingly, the content analyzer 306 may determine that a particular frame may be the starting frame of a sequence of frames showing the action of the pass play based on the rules 406 for a pass play event 404. Additionally, the rules 406 may further indicate that after the beginning of a play (e.g., the content analyzer 306 detecting a change from substantially no motion energy to motion energy), there is a time period of movement (indicating that the action of the play is happening), and then a period of substantially no movement (indicating the end of the action in the play). Accordingly, the content analyzer 306 may determine that another frame may be the ending frame of a sequence of frames showing the action of the pass play based on the rules 406 for a pass play event 404.

In another example, the content analyzer 306, based on the rules 406, may use analyzed graphics shown in the sequence of frames (e.g., rough cut portion) of a content item to delimit or mark one or more frames from the sequence of frames. Thus, the content analyzer 306 may determine that the time on a game clock is static (e.g., staying at a constant time, such as 11:50). The content analyzer 306 may then determine in the sequence of frames, based on detected graphics, at which point the game clock begins to count down. Thus, the content analyzer 306 may determine that the one or more frames showing the game clock beginning to count down may indicate the start of the action of a play. Further, the content analyzer 306 may subsequently determine in the sequence of frames where the game clock stops counting down and becomes static again. Thus, the content analyzer 306 may determine that the one or more frames showing the game clock stopping counting down and becoming static again may indicate the end of the action of a play.

In one example, the content analyzer 306 may use the display view (step 512) and a game clock state (step 510) to determine whether a play and/or action of the play may still be going. Thus, a football game may have a wide horizontal field perspective at a start of action of a pass play, and then the display view may change to a zoomed in view of a receiver after the receiver catches a pass. In this scenario, the content analyzer 306 may determine that the game clock is still moving after the display view changed to a zoomed in view, and thus, based on the rules 406, might not determine that the change in display view indicates the end of the action of the play, but may indicate the action of the play is continuing.

In another example, the local office 103 or other entity may receive metadata describing three events of a touchdown, an extra point kick, and a kick off, which may happen during a football game in sequential order. The metadata may also indicate that all three events happened when the game clock goes from 8:03 to 7:45 left in the first quarter. In football, after the scoring of a touchdown, the clock might not count down for the extra point kick and the kick off, and might not begin to count down until: (1) a person touches the ball in the field of play after the kickoff or (2) a subsequent play happens after the kickoff (if no player touched the ball in the field of play during the kickoff play). Thus, the content analyzer 306 might not be able to use information about the timing of the game in determining frames associated with the action of each of these three events, because the game clock will be static beginning at the end of the touchdown until the end of the kick off. The content analyzer 306 may then analyze the display graphics to determine a first frame of when the game clock hits 8:03 left in the first quarter (or greater than 8:03, such as 8:10, if the game clock might not be visible at 8:03) to determine a starting frame for the rough cut portion that includes the sequence of the three events. The content analyzer 306 may then analyze the display graphics to determine a last frame of when the game clock hits 7:45 to determine an ending frame for the rough cut portion that includes the sequence of the three events. Alternatively, if the game clock is might not be visible, then content analyzer may determine a frame that shows a time less than 7:45 left in the first quarter (such as 7:40 left in the first quarter) to determine an ending frame for the rough cut portion that includes the sequence of the three events. The content analyzer 306 may then delimit the three events (e.g., the action of the three plays) by examining the different views associated with each of these types of events. Thus, based on the rules 406, the content analyzer 306 may associate the frames with a display view of a zoomed in shot of the end zone as being the end of the touchdown event, a switch to a display view showing either behind or in front of the end zone/goal posts as constituting the beginning of the extra point kick event, and a switch to a wide horizontal field perspective view as the beginning of the kick off. The content analyzer 306 may then delimit frames for each event based on their associated display view, such as the touchdown event going from the first frame in the rough cut portion to the frame that indicating the zoomed in shot of the end zone showing the touchdown, the extra point event going from the change in display view to showing the goal posts to the commercial break or change in display view to the wide perspective, and then the kick off as the rest of the frames in the rough cut subsequent the commercial break or wide perspective display view.

Further, in addition to the graphics and/or display views, the content analyzer 306 may analyze the audio (such as environmental sounds) or closed captioning and/or the motion energy of the frames of the rough cut portion of frames. Thus, continuing with the above example, the content analyzer 306 may determine that a referee's whistle was blown after the first frame in the rough cut. The rules 406 may indicate that a whistle during a touchdown event indicates the end of the action for the touchdown event (e.g., the touchdown was scored). Thus, after determining the audio of this whistle, the content analyzer 306 may then identify the corresponding frame(s) as the end of the touchdown event. However, in some situations there may have been a penalty (e.g., false start penalty), and the referee's whistle may indicate that the play is whistled dead because of the penalty, or the detected motion energy may detect a referee throwing a yellow penalty flag onto the field. Thus, based on the rules 406, the content analyzer 306 may determine either that the display view might not have changed (e.g., indicating no touchdown even though a whistle was blown), or may determine that the clock might not have moved or was reset to a previous time (e.g., indicating no play). Thus, in this scenario, the players may line up again for the play, then the content analyzer 306 may analyze the motion energy, then the content analyzer 306 may detect an audio whistle (separate from the first whistle where the play was blown dead because of the penalty), then the content analyzer 306 may either detect on the displayed graphic scoreboard that the score goes up by 6 points within a few seconds of the whistle or analyze the motion energy to determine that the motion stopped in end zone. Using all any of the above analyzed information, the content analyzer 306 may then determine, based on the rules 406, the frames corresponding to the end of the touchdown play.

Thus, the rules 406 may indicate which information (e.g., from steps 508, 510, 512, and 514) has greater weight in certain events 404 and circumstances. In some cases, information from one step (e.g., step 512) may override information from another step (e.g., step 514). In other cases, information from one step (e.g., step 508) may be used in conjunction with information from another step (e.g., step 510). In some embodiments, information from one or more of the steps 508, 510, 512, and 514 might not be available for a particular set of frames of content, and thus any information available may be used in the segmenting, delimiting, marking, or extracting frames of interest. It is noted, however, that while steps 508, 510, 512, and 514 produce options for the content analyzer 306 to use in marking frames of interests, steps 508, 510, 512, and 514 might not be mutually exclusive of one another, and may depend on information from another step. For example, as stated above, the motion profile may depend upon the display view or camera angle.

In some embodiments, a device, such as a camera, microphone, motion sensor, and other devices, may be used to capture environmental features/factors and correlate those captured features to one or more frames of content (e.g., displayed content). The device may be the input device 314. The device may determine various user reactions to content displayed on the client device 302. The device may then correlate user reaction to one or more frames of content (e.g., displayed content), such as the marked frames. The device may then transmit this correlation information to the client device 302 and/or the local office 103, which may then analyze and determining one or more frames or events (e.g., action of an event) in the content based on the user reactions. For example, during a soccer game, a player may dribble the soccer ball, and then shoot and score the ball for a goal. A camera and/or microphone connected to the client device 302 may capture one or more viewers' reaction to the goal. A viewer may jump up and down or scream with excitement right after the goal is scored. The camera and/or microphone may then capture and transmit image, audio, or other data to the client device 302 and/or the local office 103. Based on this information, the client device 302 and/or the local office 103 may determine that something exciting may have happened during at this time during the content or event, and thus may mark one or more corresponding frames in the content. According to some aspects, the client device 302 and/or the local office 103 may mark a key frame corresponding to a high amount of environment features/factors (e.g., spontaneous motion and/or sound). This key frame may then be used to identify a key aspect of an associated event or marked group of frames. In the above example, a key frame may correspond to the frame when the soccer ball hits the back of the net, and thus may be used by the client device 302 and/or the local office 103 to represent the goal event. For example, the client device 302 and/or the local office 103 may use the frame as a thumbnail, and may display this thumbnail on a display, such that a user may select the thumbnail to select the corresponding event (e.g., the goal event). In some embodiments, the client device 302 and/or the local office 103 may use any of the frames of a marked set of frames as a key frame and/or thumbnail as described above.

In step 518, the local office 103 or other entity may determine whether there may be more events of interest left to be analyzed by the content analyzer 306 to mark or extract the frames of interest (e.g., the frames showing the action of the event). For example, at step 506, the local office 103 or other entity may have determined more than one rough cut portions containing one or more events, but may have only analyzed one of those rough cut portions in steps 508, 510, 512, 514, and 516. If the local office 103 determines that there are more events of interest left to be analyzed, then the process 500 continues to step 520, where another portion (e.g., the rough cut portion) may be retrieved by the content analyzer 306. Process 500 then continues to step 508, where the content analyzer 306 determines the motion energy for that newly retrieved portion. In some embodiments, a rough cut portion that has already been analyzed may be analyzed again if the portion contains additional events of interest. If the local office 103 determines that there might not be any more events of interest left to be analyzed, then the process 500 may continue to step 522.

At step 522, the local office 103 or other entity may obtain external data and then otherwise arrange segments of content (e.g., the determined, delimited, marked, identified, and/or extracted frames of content from step 516) based on the external data. It is noted that the local office 103 may extract segments of content without the use of external data. The local office 103 may obtain the external data from various sources, such as from the content sources 318. The local office 103 may use this external data to sort, prioritize, arrange, or rank extracted segments of frames. For example, the local office 103 may determine that a topic about a content item on social media may be trending/popular (e.g., from hashtags or other social media indicators of a football or soccer game). The trending topic may be, for example, associated with a play in a sporting game or with a scene on a program. Thus, after the local office 103 detects this trending topic, the local office 103 may then provide a higher rank (e.g., compared to other extracted sets of frames) for an extracted set of frames corresponding with that tending topic.

Additionally, the local office 103 or other entity may create a profile that may identify content preferences for a user and/or the client device 302 and use these preferences at the external data. The local office 103 may dynamically create the profile based on a user's behavior in accessing content. For example, the local office 103 may determine that a user may tend to watch highlight plays of a football game (e.g., fast forwarding to highlight plays in a DVR or on-demand platform). Thus, the local office 103 may determine that highlight sports plays are the segments of interest for this user and may extract frames of content showing the highlight sports plays.

Alternatively, a user may input into the client device 302 or the local office 103 (or other entity) the user's personal preferences (e.g., external data) regarding the preferred frames of content the user would like the local office 103 to extract. For example, a user may input that the user would like to view and/or access all plays during a football game that resulted in a gain of 20 yards or more. Thus, the local office 103 may then extract the frames of content that include plays (e.g., the action of the plays) resulting in a gain of 20 yards or more.

At step 524, the local office 103 may then transmit the determined, marked, delimited, identified, and/or extracted content segments or frames of content to the client device 302. The client device 302 may store the extracted content segments or frames of content, which may subsequently be accessed by a user. For example, a user may access extracted content segments using an application that may be stored on the client device 302. Through the application, a user may pick and choose which content segments the user may wish to access. Additionally, the local office 103 may order or arrange the extracted content segments using external data, as described in step 518. In such situations, the local office 103 may provide a recommendation on the client device 302 to a user for a particular extracted content segment. In other situations, a user may wish to access the highlight plays of a football game. Thus, the local office 103 may transmit to the client device 302 the highlight plays of a desired football game for a user or the client device 302. In some cases, the local office 103 may store the extracted content segments. In some cases, the client device 302 may display a thumbnail (such as discussed herein) that may represent a key frame or feature of a marked set of frames.

Figure 6:
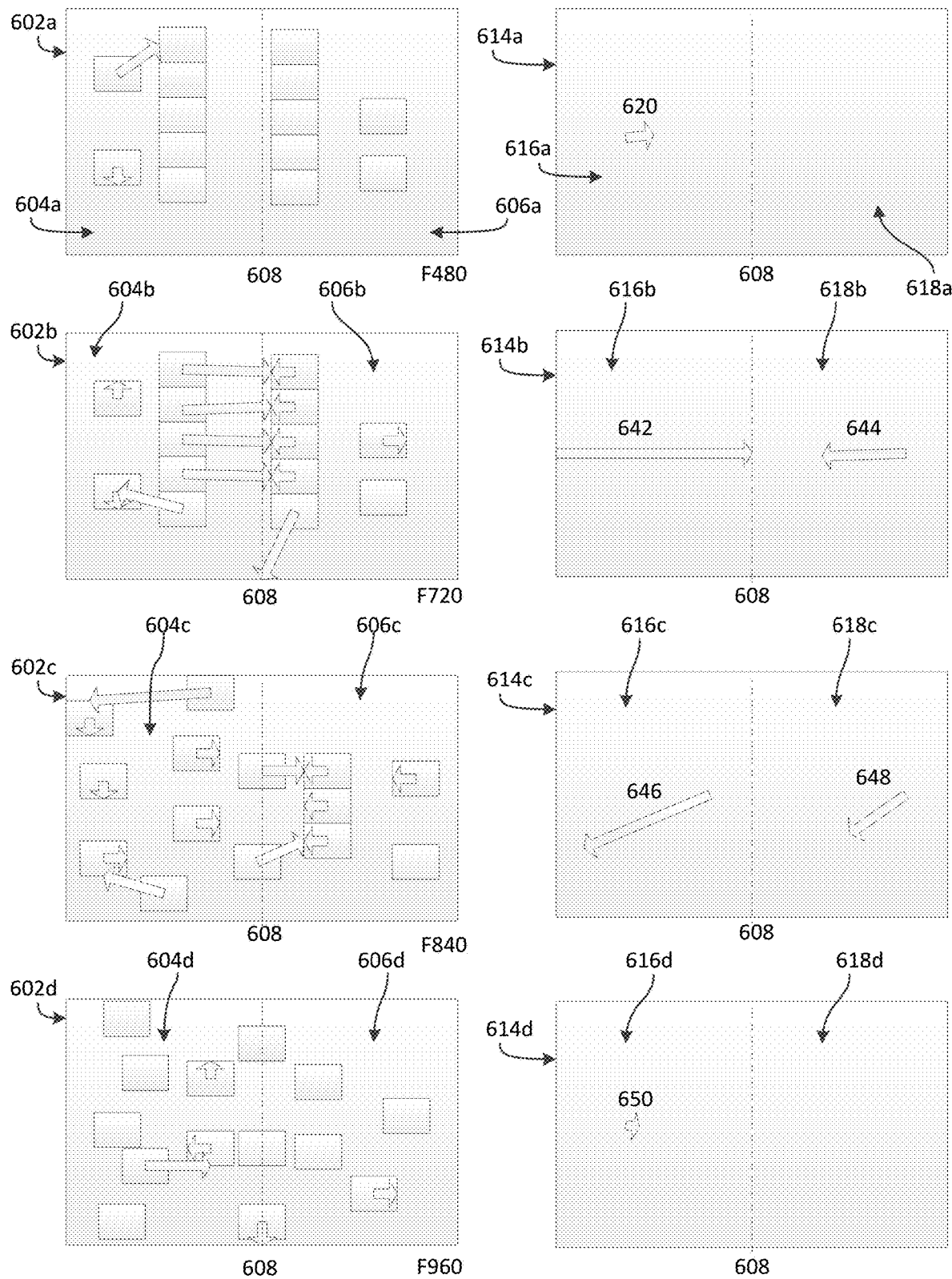
FIG. 6 illustrates an example diagram in accordance with aspects of the present disclosure.

FIG. 6 illustrates an exemplary diagram 600 illustrating an example sequence of analyzing motion in a sequence of frames of a football content item. Diagram 600 may begin by having the content analyzer 306 retrieve, from the rules engine 308, the rules 406 corresponding to a content type 402 of football and an event 404 of pass play. The display 602a displays frame number 480 out of a frame sequence of 1200 frames. The local office 103 may retrieve the 1200 frames from a content stream of a football game. The local office 103 may use metadata obtained via a metadata source 316 to determine that the pass play (event) lasted 50 seconds (e.g., 1200 frames). The metadata may also include timing information that may allow the local office 103 to zero in on the approximate frames containing the event (e.g., rough cut). Thus, as stated above, the local office 103 may also use on screen graphics (such as a game clock) to determine the rough cut (e.g., the metadata may indicate that a play happened between the game time of 12:00 and 11:10 in the first quarter, and the local office 103 may use that information and a displayed game clock to determine the sequence of frames generally corresponding to the game time of between 12:00 and 11:10 in the first quarter). Using a frame rate of 24 frames per second, the display 602a displays the pass play at the 20 second mark (480 frames divided by 24 frames per second) out of the total 50 second pass play.

The rules 406 for the pass play may indicate that two teams (e.g., players on opposite sides of the frame) move to line up along a substantially straight line (e.g., the line 608 or the line of scrimmage). Thus, the expected motion for this rule may include little to no motion of objects in the frames of the extracted content item. Using this expected motion from the rules 406, the content analyzer 306 may look for this expected motion in the 1200 frames. Thus, the content analyzer 306 may be expecting or looking for motion corresponding to this rule (e.g., looking for little to no motion of objects), and may recognize motion substantially matching or corresponding to this expected motion at frame 480 shown in the display 602a.

To recognize motion in the frames, the content analyzer 306 may determine motion vectors for one or more analyzed portions or sections of the sequence of frames. For example, the display 602a may be divided in sections, such as the section 604a and 606a, which are illustrated as being divided with a dotted line 608. At this point in the sequence, the content analyzer 306 may determine motion vectors for one or more objects/blocks displayed in the frames. In some embodiments, the rules 406 may specify the level of granularity of the image processing/analysis that analyzer 306 performs. For example, the rules 406 may instruct the content analyzer 306 to determine motion energy of individual objects displayed in the frames, or may instruct the content analyzer 306 to determine motion of a group of pixels in the frames (such as the sections 604a and 606a).

In the display 602a, some of the blocks are shown with motion vector arrows indicating a direction of motion (e.g., the direction in which each vector arrow points) and magnitude of motion (e.g., the longer the arrow the greater the magnitude or speed of the motion). Other blocks (e.g., the ones shown with no vector) may have substantially little to no motion, or alternatively, have motion energy that might not meet a threshold motion energy established by the content analyzer 306. In some embodiments, the content analyzer 306 may determine a motion vector for more than one object, such as for a plurality of football players. The rules 406 may also instruct the content analyzer 306 to determine a motion vector for a constant portion of a frame over the course of several frames (e.g., motion vector each for the top-left 25% of the frame, top-right 25% of the frame, bottom-left 25% of the frame, and bottom-right 25% of the frame). In such a situation, the content analyzer 306 may assign a motion vector to a particular section of a frame and might not necessarily assign a motion vector to individual objects in the frame. In some cases, the content analyzer 306 may determine motion energy to be a quantity or value (e.g., magnitude only) instead of a vector.

In some embodiments, the content analyzer 306 may determine overall or average motion energy for a frame or section of a frame, such as shown in the display 614a. Using the overall motion may be a simpler, and less computationally intensive, approach to analyzing the video. The content analyzer 306 may determine the average motion energy by adding the vectors of interest to determine a resultant vector. Thus, the content analyzer 306 may determine the average motion energy in the section 604a, which may be illustrated as an average motion energy vector 620 in the section 616a of the display 614a. In some cases, the vector 620 may be considered a minima motion energy vector, such that motion energy of a preceding frame or frames of content and motion energy of a subsequent frame or frames of content may have larger motion vectors, values, and/or magnitudes than the vector 620. Thus, the vector 620 may indicate a moment of minimal motion of objects as compared to other frames in the 1200 frames of content.

Likewise, the content analyzer 306 may determine average motion energy in the section 606a, which may be illustrated as an average motion energy vector or quantity in the section 618a of the display 614a. In this case, the content analyzer 306 may determine that the average motion energy vector corresponding to the section 606a to be substantially zero (e.g., might not be meeting a threshold value for detected motion), as shown by the blank area in the section 618a. Thus, because the motion energy corresponding to the section 606a might not meet a threshold value for detecting motion, the motion energy for the section 606a (e.g., a zero vector) may be considered a minima motion energy vector. In some embodiments, because the content analyzer 306 has determined a minimal amount of motion energy in the objects of frame 480, frame 480 may be considered a minima (or minimal) frame. In some cases, frames immediately preceding and/or following a minima frame may also exhibit a similar minimal amount of motion energy as a minima frame. For example, in a football pass play, the two teams may line up along the line of scrimmage and exhibit little to no movement for several seconds (e.g., 10 seconds—from frame 480 until 720) before the quarterback snaps the ball causing subsequent movement of the players. Thus, a portion of the frames from frames 480 to 720 may be considered minima frames.

The content analyzer 306 may determine motion over a portion of frames (or time period) of content. For example, the content analyzer 306 may determine motion for the blocks in the display 602a over the course of 120 frames (e.g., the sequence of frames from frame 360 to frame 480), which may correspond to 5 seconds. The content analyzer 306 may use any number of frames to determine motion. In some embodiments, the content analyzer 306 may use non-sequential frames to determine motion, such as using the even numbered frames in the sequence of frames from frame 360 to frame 480 (e.g., sampling).

In the display 614a, sections 616a and 618a may be divided by the line 608 (e.g., the line of scrimmage). However, the content analyzer 306 may divide and/or analyze frames in a number of ways, such as in equally and non-equally divided sections. In some embodiments, the content analyzer 306 may analyze motion energy in only a portion of a frame and might not analyze motion energy in the rest of a frame.

The display 602b illustrates frame 720 out of the sequence of 1200 frames (e.g., 30 seconds into the 50 second pass play). The rules 406 for the pass play may indicate that the players on one side of the line of scrimmage (e.g., in the section 604b) may begin to move horizontally in one direction, and players on the other side of the line of scrimmage (e.g., in the section 606b) may begin move horizontally in another direction (e.g., the start of the action of the play). Using this expected motion from the rules 406, the content analyzer 306 may look for this expected motion in the 1200 frames, and thus may determine that this expected motion is present at frame 720. Thus, the content analyzer 306 may be expecting or looking for motion corresponding to this rule, and may recognize motion substantially matching or corresponding to this expected motion at frame 720 shown in the display 602*b*.

To recognize motion in the frames, the content analyzer 306 may determine motion vectors for each of the blocks/objects displayed in the frames. In the display 602*b*, each of the blocks are shown with motion vector arrows indicating a direction of motion (e.g., the direction in which each vector arrow points) and magnitude of motion (e.g., the longer the arrow the greater the magnitude or speed of the motion). The content analyzer 306 may then determine the average motion energy in sections 604*b* and 606*b*, which may be illustrated respectively as the average motion energy vectors 642 and 644 in sections 616*b* and 618*b* of the display 614*b*, and thus may satisfy any minimum motion energy threshold for detection.

As shown in the display 614*b*, the vector 642 shown in the section 616*b* may be directed in a first direction, such as to the right of the display 614*b*, and the vector 644 may be directed in an opposite direction, such as to the left of the display 614*b*. This may indicate that the average/overall direction of the motion of the objects in the section 604*b* may be to the right of the display 614*b*, and the average/overall direction of the motion of the objects in the section 606*b* may be to the left of the display 614*b*. Also, the vector 642 may have a greater magnitude than the vector 644, which may indicate the average/overall speed of the motion of the objects in the section 604*b* may be greater than the average speed of the motion of the objects in the section 606*b*.

The display 602*c* illustrates frame 840 out of the sequence of 1200 frames (e.g., 35 seconds into the 50 second pass play). The rules 406 for the pass play may indicate that the players from both teams may be on either side of the line of scrimmage 608 and may be moving in various directions at different speeds (e.g., in the action of the pass play). Using this expected motion from the rules 406, the content analyzer 306 may look for this expected motion in the 1200 frames, and thus may determine that this expected motion is present at frame 840. Thus, the content analyzer 306 may be expecting or looking for motion corresponding to this rule, and may recognize motion substantially matching or corresponding to this expected motion at frame 840 shown in the display 602*c*.

To recognize motion in the frames, the content analyzer 306 may determine motion vectors for each of the blocks/objects displayed in the frames. In the display 602*c*, each of the blocks are shown with motion vector arrows indicating a direction of motion (e.g., the direction in which each vector arrow points) and magnitude of motion (e.g., the longer the arrow the greater the magnitude or speed of the motion). The content analyzer 306 may then determine the average motion energy in sections 604*c* and 606*c*, which may be illustrated respectively as the average motion energy vectors 646 and 648 in sections 616*c* and 618*c* of the display 614*c*.

As shown in the display 614*c*, the vector 646 may be directed in a first direction, such as in a diagonal direction directed down and to the left of the display 614*c*, and the vector 648 may be directed in a second direction, such as to the left of the display 614*c*. This may indicate that the average/overall direction of the motion of the objects in the section 604*c* may be in a diagonal direction directed down and to the left of the display 614*c*, and the average/overall direction of the motion of the objects in the section 606*c* may be to the left of the display 614*c*. Also, the vector 646 may have a greater magnitude than the vector 648, which may indicate the average/overall speed of the motion of the objects in the section 604*c* may be greater than the average speed of the motion of the objects in the section 606*c*.

The display 602*d* illustrates frame 960 out of the sequence of 1200 frames (e.g., 40 seconds into the 50 second pass play). The rules 406 for the pass play may indicate that the players from both teams may be on either side of the line of scrimmage 608 and may be moving in random/non-uniform directions at substantially little to no speed (e.g., the player that caught the ball has been tackled, and the players are getting up from the tackle pile). Using this expected motion from the rules 406, the content analyzer 306 may look for this expected motion in the 1200 frames, and thus may determine that this expected motion is present at frame 960. Thus, the content analyzer 306 may be expecting or looking for motion corresponding to this rule, and may recognize motion substantially matching or corresponding to this expected motion at frame 960 shown in the display 602*d*.

To recognize motion in the frames, the content analyzer 306 may determine motion vectors for each of the blocks/objects displayed in the frames. In the display 602*d*, some of the blocks are shown with motion vector arrows indicating a direction of motion (e.g., the direction in which each vector arrow points) and magnitude of motion (e.g., the longer the arrow the greater the magnitude or speed of the motion). The content analyzer 306 may then determine the average motion energy in sections 604*d* and 606*d*, which may be illustrated respectively as the average motion energy vector 650 in the section 616*d* of the display 614*d* and a blank display section 618*d* of the display 614*d*.

As shown in the display 614*d*, the vector 650 may be directed in a first direction, such as to the right of the display 614*d*. The blank display section 618*d* of the display 614*c* may illustrate substantially little to no average motion energy in the section 606*d* (e.g., the detected motion energy might not satisfy a motion energy threshold for detection). This may indicate that the average/overall direction of the motion of the objects in the section 604*d* may be diagonal direction directed to the right of the display 614*d*, and the average/overall direction of the motion of the objects in the section 606*d* may be substantially zero (e.g., might not be detected). Thus, because the motion energy corresponding to the section 604*d* might not meet a threshold value for detecting motion, the motion energy for the section 604*d* (e.g., a zero vector) may be considered a minima motion energy vector. Additionally, because the content analyzer 306 has determined a minimal amount of motion energy in the objects of frame 960, frame 960 may be considered a minima (or minimal) frame because motion in frames preceding frame 960 may have exhibited a greater amount of motion energy than frame 960. The last 240 frames (from frames 961-1200—10 seconds) of the pass play may include the players returning to their respective side of the line of scrimmage 608. Content analyzer 306 may then analyze motion in one or more frames for a subsequent play (e.g., the event 404) based on one or more corresponding rules 406.

According to some aspects, the content analyzer 306 may delimit frames of a content item based on the rules 406 for an event 404 associated with the content item. Referring to FIG. 6, the rules 406 may indicate that the start of action of a pass play may include one team lining up on one side of the line of scrimmage and the other team lining up on the other side of the line of scrimmage. The rules 406 may further indicate that after the teams line up along the line of scrimmage, there is substantially no motion energy on either side of the line of scrimmage, and then a sudden change in motion of the players. The rules 406 may further indicate that the moment of the sudden change in motion of the players indicates the start of the action of the pass play. Accordingly, the content analyzer 306 may determine that frame 720 shown in the display 602b may be the starting frame of a sequence of frames showing the action of the pass play based on the rules 406 for a pass play event 404. Additionally, the rules 406 may further indicate that after the beginning of a play (e.g., the content analyzer 306 detecting a change from substantially no motion energy to motion energy), there is a time period of movement (indicating that the action of the play is happening), and then a period of substantially no movement (indicating the end of the action in the play). Accordingly, the content analyzer 306 may determine that frame 960 shown in the display 602d may be the ending frame of a sequence of frames showing the action of the pass play based on the rules 406 for a pass play event 404.

Figure 7:
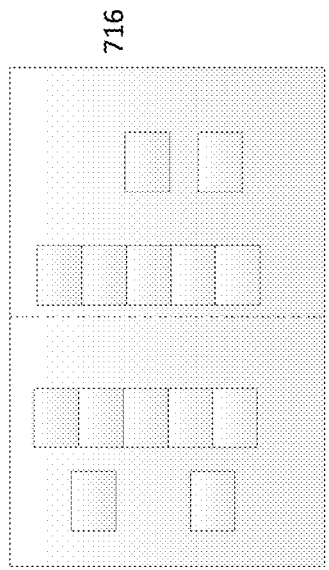
FIG. 7 illustrates an example system in accordance with aspects of the present disclosure.

FIG. 7 illustrates an example diagram 700 of a user interface 702 in accordance with one or more disclosed features described herein. The user interface 702 may a computer application that may be operated on and/or executed with a client device, such as the device 200 or the client device 302. The user interface 702 may be displayed on a display 704, which may be the same or similar to display 206. Users may interact with the user interface 702 via an input device, such as input device 208 or 314. The user interface 702 may be used to display on the client device 302 information related to an event. For example, after the local office 103 or other entity marks and/or delimits events of interest in a content item (as described herein), the local office 103 or other entity may transmit these events to a client device 302, where the client device 302 may organize the events in an application, such as the user interface 702. Then, when a user desires to view/access an event, the user may retrieve the desired event via the user interface 702. The user interface 702 may include a plurality of fields/features, such as a timeline 706, an event title 712, event information 714, an event preview screen 716, an event summary 718, the content information 720, and one or more operation input(s) 722. The user interface 702 may include other features not explicitly shown in FIG. 7.

The timeline 706 may indicate events that are marked as events of interest. The timeline 706 may indicate these events with the marks 708. In some embodiments, the marks 708 may be spaced equally on the timeline 706 even though some marked events may last longer than other marked events. In some other embodiments, the marks 708 may be non-equally spaced on the timeline 706, such as having the distance between the marks 708 correspond to how long the corresponding events last. According to some aspects, a user may interact with the timeline 706 such as by selecting a mark 708 for a desired event with an input device. In some embodiments, a user may select in between the marks 708, thus selecting events or acts that might not be indicated by a mark 708. For example, the timeline 706 may correspond to a portion or entire program, such as a quarter of a football game or the whole football game. In such cases, the marks 708 may indicate events of interest, such as scoring plays, and the portions of the timeline 706 between the marks 708 may include other events and acts that occur between the scoring plays.

According to some aspects, the user interface 702 may indicate with the marks 708 events having a higher prioritization (such as described herein, such as in step 516). Additionally, a user may provide an input to the client device 302 or the local office 103 indicating which events should be prioritized. For example, a user may use an input device to select an option on the user interface 702 to only indicate scoring plays with the marks 708.

A selected event may be indicated by an indicator 710, which may be an enlarged mark and/or highlighted in some way that distinguishes it from a mark 708. A selected event may further be identified with an event title 712, which may provide a brief description of the event. As shown in FIG. 7, the selected event corresponds to the 11:30 mark in the first quarter, and has an event title 712 of "11:30 in the First Quarter." In other embodiments, the title may describe other features of the event, such as a scene, setting, actor, etc. In some embodiments, a user may customize the title of an event, such as relabeling it with a personal preference. In some embodiments, non-selected events (e.g., events marked with the marks 708) may also include an event title 712.

A selected event may be further described with the event information 714. Event information 714 may include more and/or additional detail than the event title 712, such as a location (e.g., 43 yard line, Philadelphia, etc.) and contextual information (e.g., PHI Offense, $2^{nd}$ down and 4 yards to go, etc.). In some embodiments, non-selected events (e.g., events marked with the marks 708) may also include event information 714.

A selected event may further be indicated with an event preview screen 716. The event preview screen 716 may display one or more of the frames for the selected event. In some cases, the frame corresponding to the beginning of the event (or action of the event) may be displayed as a freeze frame on the preview screen 716. In other cases, other frames may be displayed as a freeze frame. In one example, the preview screen may display a key frame of a marked set of frames, such as discussed above. This key frame may then be used to identify a key aspect or feature of an associated event or marked group of frames, such as the frame corresponding to when a soccer ball hits the back of the net for a goal, the frame corresponding to when the game winning shot went through the net in a basketball game, the frame corresponding to when a player caught a touchdown, and the like. In some cases, the preview screen 716 may display a plurality of frames, such that a user may view a portion of or entire event, such as from the beginning of the action to the end of the action. In some cases, audio corresponding to the displayed frames may be played along with the preview of the event.

A selected event may further be described with an event summary 718. The event summary may summarize what happened in or during the event. For example, during an awards program, an event summary may state "Best Actor Announcement and Presentation—Matthew McConaughey—Dallas Buyers Club as Ron Woodroof," or "Musical Act—Katy Perry—Roar—MTV Video Awards." As shown in FIG. 7, the event summary 718 states "Pass PHI 23 Yard Gain," which may indicate that the event is a pass play, Philadelphia's offense performed the pass play, and the pass play resulted in a 23 yard gain.

The user interface 702 may further include a section listing the content information 720. The content information 720 may include any information describing the content from which the event(s) marked in the timeline 706 are obtained. Such information may be derived from metadata or the local office 103's (or other entity's) analysis, as described herein. Such information may include statistics, names, awards, score, type of play/event, teams, contextual data, timing data, etc. In some embodiments, the content information 720 may include information describing content that might not be affiliated with the events marked in the timeline 706. For example, the content information 720 may list other content items (e.g., programs) from which a user may select to view corresponding events of interest. Thus, if a user selects one of these other content items, the local office 103 and/or the client device 302 may retrieve that content item's corresponding events of interest (which may have been previously delimited and/or marked by the local office 103 or other entity), and display information for that content item's events as similarly shown in FIG. 7.

The user interface 702 may further include one or more operation inputs 722. The operation inputs 722 may be selectable items that may initiate one or more features of the user interface 702. In some embodiments, a user may select the operation inputs 722 using an input device. FIG. 7 illustrates some exemplary options for the operational inputs 722. For example, when a user selects the "A" button on a remote control, all the events marked with the marks 708 may be accessed and played on the client device 302. When a user selects the "B" button on a remote control, all of the favorite events marked with the marks 708 may be accessed and played on the client device 302. In such a case, the local office 103 or other entity may determine the favorite events using a user input of preferred events/criteria or any other way, such as disclosed herein. When a user selects the "C" button on a remote control, more options/operations may be presented to the user. When the user selects the "OK" button on a remote control, the currently selected/highlighted event may be accessed and played on the client device 302, such as in a full screen mode with or without the corresponding audio. Although not explicitly shown, any other operation input may be implemented in the user interface 702.

According to some aspects, after the indicator 710 highlighting one event moves to a second event (such as by user input of an input device), any of the information shown on the user interface 702 may be updated with the second event's information. In some embodiments, one or more events may be individually selected to form a playlist of events. In some cases, the events on a playlist may come from the same content item, such as multiple plays from a football game. In other cases, the events on a playlist may come from a plurality of content items, such as having on a single playlist multiple plays from a football game, award presentations, and musical performances.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
receiving, by a computing device, metadata indicative of a time for a beginning of an event occurring in a video program and a time for an ending of the event;
determining, based on the metadata and based on a plurality of video frames associated with the video program:
a first video frame, from the plurality of video frames, comprising a first displayed time before the time for the beginning of the event; and
a second video frame, from the plurality of video frames, comprising a second displayed time after the time for the ending of the event;
selecting a portion of the video program, the portion comprising the first video frame, the second video frame, and video frames between the first video frame and the second video frame;
determining an expected motion energy of objects associated with the event;
determining, based on a comparison of motion energy of objects in the selected portion of the video program with the expected motion energy, one or more video frames, within the selected portion, in which the event occurs; and
storing information indicating the one or more video frames in which the event occurs.

2. The method of claim 1, wherein determining the first video frame and the second video frame is based on performing optical character recognition on the plurality of video frames associated with the video program.

3. The method of claim 1, wherein the first video frame comprises a first game clock showing the first displayed time, and wherein the second video frame comprises a second game clock showing the second displayed time.

4. The method of claim 1, wherein a first game clock showing a third displayed time corresponding to the time for the beginning of the event is not visible in the video program, and wherein a second game clock showing a fourth displayed time corresponding to the time for the ending of the event is not visible in the video program.

5. The method of claim 1, further comprising:
dividing one or more frames of the portion of the video program into a plurality of sections;
determining motion vectors of objects associated with one or more of the sections; and
wherein the determining the one or more video frames in which the event occurs is performed based on the motion vectors of the objects associated with the one or more of the sections and based on a rule indicative of expected motion vectors of the objects associated with the event.

6. The method of claim 1, further comprising:
determining a change in display view in the portion of the video program from a first display view to a second display view; and
wherein the determining the one or more video frames in which the event occurs is performed based on the change in display view.

7. The method of claim 1, further comprising:
receiving an indication of one or more environmental features in the one or more video frames in which the event occurs;
determining, based on the indication of the one or more environmental features, a key frame of the one or more video frames in which the event occurs; and
causing display of the key frame as a user-selectable thumbnail.

8. The method of claim 1, wherein the determining the first video frame is performed based on one or more first audio features associated with the plurality of video frames; and
wherein the determining the second video frame is performed based on one or more second audio features associated with the plurality of video frames.

9. An apparatus comprising:
one or more processors; and
memory storing instructions that, when executed by the one or more processors, cause the apparatus to:
receive metadata indicative of a time for a beginning of an event occurring in a video program and a time for an ending of the event;
determine, based on the metadata and based on a plurality of video frames associated with the video program:
a first video frame, from the plurality of video frames, comprising a first displayed time before the time for the beginning of the event; and
a second video frame, from the plurality of video frames, comprising a second displayed time after the time for the ending of the event;
select a portion of the video program, the portion comprising the first video frame, the second video frame, and video frames between the first video frame and the second video frame;
determine an expected motion energy of objects associated with the event;
determine, based on a comparison of motion energy of objects in the selected portion of the video program with the expected motion energy, one or more video frames, within the selected portion, in which the event occurs; and
store information indicating the one or more video frames in which the event occurs.

10. The apparatus of claim 9, wherein the instructions, when executed by the one or more processors, cause the apparatus to:
determine the first video frame and the second video frame based on performing optical character recognition on the plurality of video frames associated with the video program.

11. The apparatus of claim 9, wherein the first video frame comprises a first game clock showing the first displayed time, and wherein the second video frame comprises a second game clock showing the second displayed time.

12. The apparatus of claim 9, wherein a first game clock showing a third displayed time corresponding to the time for the beginning of the event is not visible in the video program, and wherein a second game clock showing a fourth displayed time corresponding to the time for the ending of the event is not visible in the video program.

13. The apparatus of claim 9, wherein the instructions, when executed by the one or more processors, cause the apparatus to:
divide one or more frames of the portion of the video program into a plurality of sections;
determine motion vectors of objects associated with one or more of the sections; and
determine the one or more video frames in which the event occurs based on the motion vectors of the objects associated with the one or more of the sections and based on a rule indicative of expected motion vectors of the objects associated with the event.

14. The apparatus of claim 9, wherein the instructions, when executed by the one or more processors, cause the apparatus to:
determine a change in display view in the portion of the video program from a first display view to a second display view; and
determine the one or more video frames in which the event occurs based on the change in display view.

15. The apparatus of claim 9, wherein the instructions, when executed by the one or more processors, cause the apparatus to:
receive an indication of one or more environmental features in the one or more video frames in which the event occurs;
determine, based on the indication of the one or more environmental features, a key frame of the one or more video frames in which the event occurs; and
cause display of the key frame as a user-selectable thumbnail.

16. A non-transitory computer-readable medium storing instructions that, when executed, cause:
receiving, by a computing device, metadata indicative of a time for a beginning of an event occurring in a video program and a time for an ending of the event;
determining, based on the metadata and based on a plurality of video frames associated with the video program:
a first video frame, from the plurality of video frames, comprising a first displayed time before the time for the beginning of the event; and
a second video frame, from the plurality of video frames, comprising a second displayed time after the time for the ending of the event;
selecting a portion of the video program, the portion comprising the first video frame, the second video frame, and video frames between the first video frame and the second video frame;
determining an expected motion energy of objects associated with the event;
determining, based on a comparison of motion energy of objects in the selected portion of the video program with the expected motion energy, one or more video frames, within the selected portion, in which the event occurs; and
storing information indicating the one or more video frames in which the event occurs.

17. The non-transitory computer-readable medium of claim 16, wherein the instructions, when executed, further cause:
determining the first video frame and the second video frame based on performing optical character recognition on the plurality of video frames associated with the video program.

18. The non-transitory computer-readable medium of claim 16, wherein the first video frame comprises a first game clock showing the first displayed time, and wherein the second video frame comprises a second game clock showing the second displayed time.

19. The non-transitory computer-readable medium of claim 16, wherein a first game clock showing a third displayed time corresponding to the time for the beginning of the event is not visible in the video program, and wherein a second game clock showing a fourth displayed time corresponding to the time for the ending of the event is not visible in the video program.

20. The non-transitory computer-readable medium of claim 16, wherein the instructions, when executed, further cause:
dividing one or more frames of the portion of the video program into a plurality of sections;
determining motion vectors of objects associated with one or more of the sections; and wherein the determining the one or more video frames in which the event occurs is performed based on the motion vectors of the objects associated with the one or more of the sections and based on a rule indicative of expected motion vectors of the objects associated with the event.

* * * * *